US012391469B2

(12) United States Patent
Bivens et al.

(10) Patent No.: US 12,391,469 B2
(45) Date of Patent: Aug. 19, 2025

(54) CART TIPPER PROTECTION DEVICE AND PROCESS

(71) Applicant: MICROMATIC LLC, Berne, IN (US)

(72) Inventors: Charles M. Bivens, Ft Wayne, IN (US); Jarrod Phlipot, Payne, OH (US); Christopher Shock, New Haven, IN (US)

(73) Assignee: MICROMATIC LLC, Berne, IN (US)

( * ) Notice: Subject to any disclaimer, the term of this patent is extended or adjusted under 35 U.S.C. 154(b) by 364 days.

(21) Appl. No.: 17/871,346

(22) Filed: Jul. 22, 2022

(65) Prior Publication Data

US 2023/0029433 A1 Jan. 26, 2023

Related U.S. Application Data

(60) Provisional application No. 63/225,375, filed on Jul. 23, 2021, provisional application No. 63/273,386, filed on Oct. 29, 2021.

(51) Int. Cl.
*B65F 3/04* (2006.01)
*B65F 3/02* (2006.01)
(Continued)

(52) U.S. Cl.
CPC .............. *B65F 3/041* (2013.01); *B65F 3/208* (2013.01); *B65F 2003/025* (2013.01); *B65F 2003/146* (2013.01)

(58) Field of Classification Search
CPC .... B65F 3/041; B65F 3/208; B65F 2003/025; B65F 3/146
(Continued)

(56) References Cited

U.S. PATENT DOCUMENTS 3,229,832 A * 1/1966 Ferrari ...................... B65F 3/28 414/525.5
3,845,445 A 10/1974 Braun et al.
(Continued)

FOREIGN PATENT DOCUMENTS

DE 19946864 A1 * 4/2001 ................ B65F 3/00
EP 0569927 A2 * 11/1993 ................ B65F 3/00
(Continued)

OTHER PUBLICATIONS

International Searching Authority, Notification of Transmittal of the International Search Report and the Written Opinion of the International Searching Authority or the Declaration, Dec. 6, 2022, pp. 1-19, International Application No. PCT/US22/38025, Applicant: Micromatic LLC.

(Continued)

*Primary Examiner* — James Keenan
(74) *Attorney, Agent, or Firm* — WOODLING, KROST AND RUST

(57) ABSTRACT

The waste truck having a hydraulically operated packer blade in combination with a hydraulically operated rotary cart tipper driven by a rotary actuator. The packer blade resides within a chamber of the truck and is movable therein. The hydraulically driven rotary actuator of the cart tipper rotates the cart tipper from a first down position to a second up position and includes a metallic shaft with an arcuate slot therein sensed by an inductive proximity sensor. The diverter valve is a solenoid operated, 2-way normally open, pilot operated poppet valve and functions as a hydraulic interrupt valve which permits safe operation of the hydraulically operated packer blade and prevents collisions of the packer blade with the rotary cart tipper.

20 Claims, 16 Drawing Sheets

(51) Int. Cl.
*B65F 3/14* (2006.01)
*B65F 3/20* (2006.01)
(58) Field of Classification Search
USPC ............................ 414/406–409, 525.2–525.6
See application file for complete search history.

(56) References Cited

U.S. PATENT DOCUMENTS

| | | | | | |
|---|---|---|---|---|---|
| 4,020,962 | A * | 5/1977 | Colin | ........................ | B65F 3/28 414/525.5 |
| 4,722,656 | A | 2/1988 | Naab | | |
| 5,004,392 | A | 4/1991 | Naab | | |
| 5,062,759 | A * | 11/1991 | Pieperhoff | ................ | B65F 3/04 414/730 |
| 5,470,187 | A | 11/1995 | Smith et al. | | |
| 5,601,392 | A | 2/1997 | Smith et al. | | |
| 5,837,945 | A | 11/1998 | Cornwell et al. | | |
| 5,890,865 | A | 4/1999 | Smith et al. | | |
| 5,954,470 | A | 9/1999 | Duell et al. | | |
| 6,123,497 | A | 9/2000 | Duell et al. | | |
| 6,327,994 | B1 | 12/2001 | Labrador | | |
| 6,332,745 | B1 | 12/2001 | Duell et al. | | |
| 6,413,030 | B1 | 7/2002 | Jones et al. | | |
| 6,709,219 | B2 * | 3/2004 | Reed, III | .................. | B65F 3/02 414/400 |
| 6,799,934 | B1 | 10/2004 | Bartlett | | |
| 7,072,745 | B2 | 7/2006 | Pillar et al. | | |
| 7,108,473 | B2 | 9/2006 | Bartlett | | |
| 7,273,340 | B2 | 9/2007 | Arrez et al. | | |
| 7,412,307 | B2 | 8/2008 | Pillar et al. | | |
| 7,563,066 | B2 | 7/2009 | Jones et al. | | |
| 7,725,225 | B2 | 5/2010 | Pillar et al. | | |
| 7,828,353 | B2 | 11/2010 | Rosenboom et al. | | |
| 7,871,235 | B2 | 1/2011 | Jones et al. | | |
| 9,028,193 | B2 | 5/2015 | Goedken | | |
| 9,598,235 | B2 | 3/2017 | Vasilescu et al. | | |
| 10,005,587 | B2 | 6/2018 | Whitman et al. | | |
| 10,538,399 | B2 | 1/2020 | Downing et al. | | |
| 10,594,991 | B1 | 3/2020 | Skolnick | | |
| 10,750,134 | B1 | 8/2020 | Skolnick | | |
| 10,766,696 | B2 | 9/2020 | Whitfield, Jr. et al. | | |
| 10,855,958 | B1 | 12/2020 | Skolnick | | |
| 10,859,419 | B2 | 12/2020 | Buteau et al. | | |
| 10,911,726 | B1 | 2/2021 | Skolnick | | |
| 10,982,995 | B2 | 4/2021 | Curotto | | |
| 11,027,916 | B2 | 6/2021 | Yang et al. | | |
| 2002/0141854 | A1 | 10/2002 | Arrez et al. | | |
| 2003/0053895 | A1 | 3/2003 | Schrafel | | |
| 2003/0130765 | A1 | 7/2003 | Pillar et al. | | |
| 2004/0179928 | A1 | 9/2004 | Bartlett | | |
| 2005/0063807 | A1 | 3/2005 | Martin et al. | | |
| 2005/0110330 | A1 | 5/2005 | Khan et al. | | |
| 2008/0279662 | A1 | 11/2008 | Tucker | | |
| 2011/0052355 | A1 | 3/2011 | Tucker | | |
| 2012/0282077 | A1 | 11/2012 | Alberts et al. | | |
| 2013/0169467 | A1 | 7/2013 | Iagounov et al. | | |
| 2018/0334324 | A1 | 11/2018 | Haddick et al. | | |
| 2019/0270587 | A1 | 9/2019 | Haddick et al. | | |
| 2019/0385384 | A1 | 12/2019 | Romano et al. | | |
| 2020/0087063 | A1 | 3/2020 | Haddick et al. | | |
| 2020/0247609 | A1 | 8/2020 | Maroney et al. | | |
| 2020/0294401 | A1 | 9/2020 | Kerecsen | | |
| 2020/0339346 | A1 | 10/2020 | Maroney et al. | | |
| 2020/0346855 | A1 * | 11/2020 | Rocholl | .................. | B65F 3/046 |
| 2020/0398772 | A1 | 12/2020 | Wildgrube et al. | | |
| 2021/0031611 | A1 | 2/2021 | Yakes et al. | | |
| 2021/0133697 | A1 | 5/2021 | Flood | | |

FOREIGN PATENT DOCUMENTS

| | | | | | |
|---|---|---|---|---|---|
| EP | 2457850 | A1 * | 5/2012 | .............. | B65F 3/046 |
| EP | 3778434 | A1 * | 2/2021 | ................ | B65F 3/00 |
| KR | 101659598 | B1 * | 9/2016 | ........ | B65F 2003/146 |
| WO | 2004052756 | A1 | 6/2004 | | |

OTHER PUBLICATIONS

Delta Power Company, Mechanical Pressure Controls, PB-RVD Differential Area Relief Valve, Jul. 12, 2022, pp. MP20-MP21.

Delta Power Company, Solenoid Operated Directional Controls, SJ-S2D Pilot Operated Poppet, 2 Way Normally Open, Jul. 12, 2022, pp. SD84-SD85.

Delta Power Company, Mechanical Flow Controls, SO-PDS Steering Priority Flow Control Valve With Static Load Sense, Jul. 12, 2022, pp. MF64-MF65.

* cited by examiner

CART TIPPER PROTECTION DEVICE AND PROCESS

This patent application incorporates herein by reference hereto U.S. Provisional patent application Ser. No. 63/273,386, confirmation no. 1083, filed Oct. 29, 2021, in its entirety. This patent application incorporates herein by reference hereto U.S. Provisional patent application Ser. No. 63/225,375, confirmation no. 5136, filed Jul. 23, 2021, in its entirety.

FIELD OF THE INVENTION

This invention is in the field of cart tippers used in refuse collection.

BACKGROUND OF THE INVENTION

In the waste industry, there is a common problem that occurs with cart tippers being damaged by the packer blade of the waste truck on rear load trucks. All cart tipper manufacturer's products can become damaged or destroyed if the operator cycles the packing blade when the cart tipper is in a dump or up position. The refuse truck includes a chamber into which the refuse/garbage/trash is dumped. If the packer blade is actuated by the operator while the cart tipper is in the dump position, or occupying the same zone the packer blade operates within, the packer blade will collide with the cart tipper and damage it. Similarly, if the packer blade is in the fully actuated position, compacting refuse into the body, and the tipper is moved into an up position the cycling of the packer blade out of the compacting state can also damage the cart tipper.

The packer blade resides in the chamber of the waste truck, the packer blade is movable within the chamber of the waste truck, the packer blade has a first stored position in the upper portion of the chamber sometimes referred to herein as the "home" position, a second scooping position in the chamber, and a third position compressing the refuse in the chamber. In the scooping position the packer blade is moved downwardly to the rear-most part of the chamber where it thereby pulls (scoops) the refuse toward the third position compacting the refuse in the chamber.

The hydraulic system drives and moves the packer blade from: the first stored position to a second scooping position, and, then to the third position whereby the refuse is compacted in the chamber and vice-versa.

Both the cart tipper and packer blade have independent actuation and are able to operate in the same overlapping 3D space (three-dimensional space) which is called the collision zone of the two devices. Both devices are manually activated by an operator.

The packer blade can be independently set into motion and will continue to complete a full cycle of compaction and return to 'home' position regardless of the cart tipper positions. Moreover, on some waste trucks the truck driver is able to actuate the packer blade remotely (for instance from the cab of the truck) making a collision between the packer blade and the cart tipper more likely because the cart tippers are not visible to the driver, and may be positioned in the collision zone at the time of activating the packer blade.

SUMMARY OF THE INVENTION

The design to solve this problem utilizes a proximity sensor on the cart tipper device which monitors the position of the cart tipper. One sensor is used for each cart tipper.

There may be more than one cart tipper per refuse truck. When the cart tipper device rotates into a position that is established as a prescribed 'interference zone' or "collision zone", which is a point at which the packer blade can contact the cart tipper if it is mistakenly operated while the cart tipper is in the up/or dump position, the proximity sensor(s) on the cart tipper(s) will actuate a hydraulic interrupt valve (diverter valve) in the hydraulic circuit of the packer blade on the truck to close off/prevent fluid flow to the packer blade controls which would thereby prevent/lock out the packer blade from being able to move, for example, downwardly into the path of the cart tipper or outwardly from the body into the path of the cart tipper on its path to its home position.

In regard to the motion of the packer blade, most of the language pertains to the motion/position of the blade itself. However, there are actually two hydraulic valves which make the blade move. These are typically called the Sweep and Slide valves (and thusly the sweep and slide motions). The slide valve/motion is also called the Pack sometimes. Each of these motions has its own detent valve. They can operate in unison, or individually, and in both directions of the blade's movement. The actual valves are always located next to each other in the sequence of valves, and are both downstream of the hydraulic interrupt valve, so the hydraulic interrupt valve would technically block both valves from moving, thus still locking the blade. While there are two valves that contribute to the blade's movement, the disclosure herein is directed toward locking the blade itself, regardless of which valve(s) was(were) running at the time of lockout.

The refuse trucks often place the cart tippers in the up position in the interference zone without a container being dumped. Further, the collision between the packer blade and the cart tipper may occur when:

the packer blade is moving from its first home position where it is stored to the second scooping position which is downwardly and toward the rear of the refuse truck; or, the packer blade is moving from the third position to the second position.

Put another way, for a problem to occur, the packer blade(s) do not always have to be going in the downward direction from the first stored position to the second scooping position; specifically, if the packer blade is in the third position (compaction mode), the cart tipper(s) can be put into the up/dump position and then the packer blade can hit them on the return to home first position.

The packer blade may have the following movements:

- from the first position to the second position and then to the third position; or,
- from the third position to the second position and then to the first position.

The instant invention is operative regardless of the direction of movement of the packer blade. The packer blade hydraulics will continue to have fluid flow interrupted to prevent packer blade operation until the cart tipper device is rotated to a position which is out of the danger zone/collision zone. As used herein "danger zone" and "collision zone" and "interference zone" mean the same thing and are used interchangeably.

If the packer blade is in the collision zone (generally in the area of the second position) at a static/resting position—the operator can ram or push the cart tipper into the packer blade. The force behind the cart tipper is incapable of doing any damage to the packer blade as its strength and rigidity is minuscule in comparison to the packer blade.

Put another way, if the packer blade is already in the collision zone, then the cart tipper operator could run the cart tipper into the packer blade, but the cart tipper operator would be able to visually see that the cart tipper and waste can will run into the packer blade. If a collision were to be caused by the cart tipper running into the already down packer blade, then this shouldn't result in any major damage to the tipper or packer blade. There is a potential the cart tipper may be damaged in some way by hitting the packer blade under cart tipper's own hydraulic power with the packer blade in a static position in the collision zone and taking the cart tipper into (dumping position) or out of the chamber (hopper).

The packer blade usually runs continuously through its cycle in either direction from first position, to second position and then to the third position or vice-versa from third position to second position to first position once it is activated unless the operator stops it (or changes the direction of the packer blade) or if the lock out valve disclosed and described herein stops the flow of hydraulic fluid to the packer blade, which will trip the detents in the valve and require the operator to restart the packer blade cycle or move the packer blade once the cart tipper is out of the collision zone.

The disclosure of the instant invention is primarily directed to the use of a rotary actuated cart tipper; however, cart tippers can also be actuated by a linear cylinder. When using a linear cylinder, a sensor is used for detecting the lift iron position or the cylinder position. Alternatively, a rack and pinion drive and sensor can be used. A waste truck having a packer blade in combination with a rotary cart tipper is disclosed wherein:

- a hydraulic system is mounted on the waste truck;
- the rotary cart tipper includes a rotary actuator;
- the rotary actuator includes a metallic shaft and a housing, the metallic shaft of the rotary actuator includes an arcuate slot therein;
- the hydraulic system drives the shaft of the rotary actuator of the rotary cart tipper from a first down position to a second up position;
- an inductive proximity sensor is mounted in the housing of the rotary actuator or outside the actuator in proximity to the shaft of the rotary actuator;
- the inductive sensor senses the presence of the metallic shaft based on the rotary position of the arcuate slot in the metallic shaft;
- the inductive proximity sensor includes an electrical circuit, the electrical circuit adapted to operate a solenoid valve in the hydraulic circuit; and,
- the solenoid valve is a hydraulic interrupt valve removing hydraulic system fluid pressure and flow from a packer blade when the inductive proximity sensor is in proximity to the arcuate slot in the metallic shaft and the rotary cart tipper is approaching the second up position or is in the second up position—within the prescribed collision zone/danger zone.

There are no known devices or control systems in place today that solve this industry-wide problem on rear load refuse trucks with a cart tipper.

The packer blade can move in a continuous stroke in either direction, namely, from the first stored position to the second scooping position and then to the third compacting position; or, from the third position to the second position and then to the first position. The operator can also manually stop the movement of the packer blade in either direction while it is cycling. The operator can position the packer blade anywhere along its path in either direction.

If the packer blade is in the collision zone and at a static/resting position—the operator can 'ram' the tipper into the packer blade. The force behind the cart tipper is incapable of doing any damage to the packer blade in as the strength and rigidity of the cart tipper is minuscule in comparison to the strength and rigidity of the packer blade.

There is a potential the cart tipper may get damaged in some way by hitting the packer blade under its own hydraulic power with the packer blade in a static position in the collision zone but the damage would be minimal.

Cart tippers are devices used to pick up cans or waste containers. Use of a cart tipper on modern waste trucks saves time and it also saves physical wear and tear on the waste collection personnel.

The movements and processes of the cart tipper are generally as follows:

1. A down position equating to fully stowed at rest position and ready to pick up a can;
2. A pick-up point equating to the point at which the cart tipper interacts with the can/waste container and picks it up/lifts it off the ground;
3. A lifting phase or process where the can/waste container equating to the period where the cart tipper has control of the can/waste container and is lifting the can/waste container off the ground and moving it upwardly toward the dump position; the motion of the cart tipper in the lifting phase or process may be in a linear lift process or in a rotary lift process;
4. A dump position equating to the position equaling the fully up position where the cart tipper has reached the end of its defined travel and is dumping the waste can in the hopper/chamber of the waste truck;
5. A return cycle being the reversing of the tipper step 4 backwards to step 1 in the down/stowed position It is an object of the invention to prevent a collision between the packer blade and the cart tipper.

It is an object of the invention to prevent the packer blade from running into the cart tipper and damaging the cart tipper.

It is an object of the invention to prohibit actuation of the packer blade when the cart tipper is in the prescribed collision zone/danger zone which is an upper or dumping/dumped position.

It is an object of the invention to utilize a proximity sensor which senses and determines the position of the cart tipper.

It is an object of the invention to eliminate damage to cart tippers on waste vehicles which cost several thousand dollars to replace from damage caused to them by the packer blade colliding with them in the collision zone.

It is an object of the invention to eliminate damage to the packer blade caused to the packer blade as a result of the packer blade colliding with the cart tipper.

It is an object of the invention to inhibit operation of the packer blade when the cart tipper is in the up position or the dumping position corresponding to the collision zone/interference zone.

It is an object of the invention to inhibit operation of the packer blade when the cart tipper approaches or is in the up position/dumping position/collision zone.

It is an object of the invention to detect the second, up position of the cart tipper as it rotates from the first, down position to the second, up position.

It is an object of the invention to detect the second, up position of the cart tipper as it rotates from the second, up position to the first, down position.

It is an object of the invention to detect the position of the cart tipper as it rotates from the first, down position to the second, up position utilizing a potentiometer.

It is an object of the invention to use another sensor to detect the position of the cart tipper as it rotates from the first, down position to the second, up position.

It is an object of the invention to detect the position of the cart tipper as it rotates from the first, down position to the second, up position utilizing a rotary potentiometer.

It is an object of the invention to detect the position of the cart tipper as it rotates from the first, down position to the second, up position utilizing an inductive proximity sensor.

It is an object of the invention to detect the position of the cart tipper as it rotates from the first, down position to the second, up position utilizing a rotary actuator which includes a metallic shaft with an arcuate slot therein sensed by an inductive proximity sensor.

It is an object of the invention to detect the position of the cart tipper using a proximity sensor selected from the group consisting of a rotary potentiometer, a linear potentiometer, a hall proximity sensor, an ultrasonic proximity sensor, an inductive proximity sensor, a capacitive proximity sensor, laser sensor, light curtain, an optical sensor, an infrared sensor, reed switches, GMR inductive sensor, variable reluctance sensor, RVDT, rotary encoder, and magneto resistive sensors.

It is an object of the invention to utilize an inductive proximity sensor having normally open contacts in series with a control relay which, in turn, operates a solenoid operated, 2-way normally open, pilot operated poppet valve.

It is an object of the invention to utilize an inductive proximity sensor in combination with a shutoff valve to prevent operation of a packer blade.

It is an object of the invention to utilize a proximity sensor having contacts in a control system which controls a solenoid operated valve to prohibit flow and pressure to the packer blade controls.

It is an object of the invention to use a solenoid operated, 2-way, pilot operated poppet valve operated by a variety of control circuits including those utilizing normally closed contacts or normally closed poppet valves.

It is an object of the invention to operate a hydraulic interrupt valve (diverter valve) which prevents or permits operation of the hydraulically operated packer blade.

It is an object of the invention to detect the position of the cart tipper as it rotates from the first, down position to the second, up position utilizing a rotary actuator which includes a metallic shaft with an arcuate slot therein, said slot having a bottom formed by walls thereof and said slot being 3 mm deep in said cylindrical shaft of the rotary actuator.

It is an object of the invention to detect the position of the cart tipper wherein the gap between the inductive proximity sensor and the arcuate bottom of the arcuate slot is approximately 4 mm.

It is an object of the invention to detect the position of the cart tipper wherein the slot is nominally 3 mm deep in the cylindrical shaft.

It is an object of the invention to detect the position of the cart tipper wherein the slot has an arcuate bottom that is nominally 3 mm deep in the cylindrical shaft.

It is an object of the invention to detect the position of the cart tipper wherein the gap between the inductive proximity sensor and the portion of the shaft that does not have the slot is approximately 1 mm.

It is an object to position the sensor inside the actuator for protection and utilizing a slot.

It is a further object to position the sensor outside the actuator by mounting a circular disc on the actuator shaft outside the actuator as an alternative design wherein the circular disc has an arcuate void therein and an actuator mounted fixed sensor sensing the arcuate void as the actuator shaft rotates.

It is an object of the invention to detect the rotary position of the cart tipper shaft with an inductive proximity sensor having normally open contacts, and the contacts change state and close when the proximity sensor is near the portion of the cart tipper shaft that does not have the arcuate slot.

It is an object of the invention to detect the rotary position of the cart tipper shaft with a proximity sensor having contacts, and the contacts change state when the proximity sensor is near the portion of the cart tipper shaft when not near the arcuate slot.

It is an object of the invention to use an inductive proximity sensor in combination with a control relay with the control relay controlling the diverter valve, the diverter valve being a solenoid operated, 2-way normally open, pilot operated poppet valve with free reverse flow energized and de-energized.

It is an object of the invention to control two cart tippers mounted on the waste truck wherein each of the cart tippers includes an inductive proximity sensor for position detection of the rotary shaft of each cart tipper.

It is an object of the invention to protect the rotary cart tipper by locking the packer blade in place in certain circumstances.

It is an object of the invention to power the rotary cart tipper with hydraulic fluid and to power the packer blade with hydraulic fluid and to protect against collisions of the rotary cart tipper and the packer blade.

It is an object of the invention to power the rotary cart tipper with an electric motor and to power the packer blade with an electric motor and to protect against collisions of the rotary cart tipper and the packer blade.

It is an object of the invention to power the rotary cart tipper with a pneumatic motor and to power the packer blade with a pneumatic motor and to protect against collisions of the rotary cart tipper and the packer blade.

It is an object of the invention to protect multiple cart tippers used in conjunction with a packer blade, with each cart tipper having its own sensing devices or means for protecting the rotary cart tipper and the packer blade.

It is an object of the invention to use a laser or a light curtain for sensing portions of the lift iron itself.

It is an object of the invention to provide a steel shaft of the actuator which includes a cam thereon and a cam follower in combination with a switch(s) detecting the position(s) of the cam follower which can detect the position of the shaft which, in turn, said switch position(s) is/are input into an appropriate control system.

It is an object of the invention to provide a proximity sensor that can be mounted outside the actuator by mounting a circular disc on the actuator shaft outside the actuator wherein the circular disc has an arcuate void therein and the proximity sensor being an actuator mounted fixed sensor senses the arcuate void in the circular disc as the actuator shaft rotates.

It is an object of the present invention to provide, instead of the arcuate void, a rotary encoder which has voids angularly spaced near the circumference of a shaft-mounted disk in combination with a light source and a photo sensor to detect the rotary position of the shaft.

BRIEF DESCRIPTION OF THE DRAWINGS

FIG. 2 is a front view of the cart tipper in the down position where the container will be picked up from.

DESCRIPTION OF THE INVENTION

Figure 7:
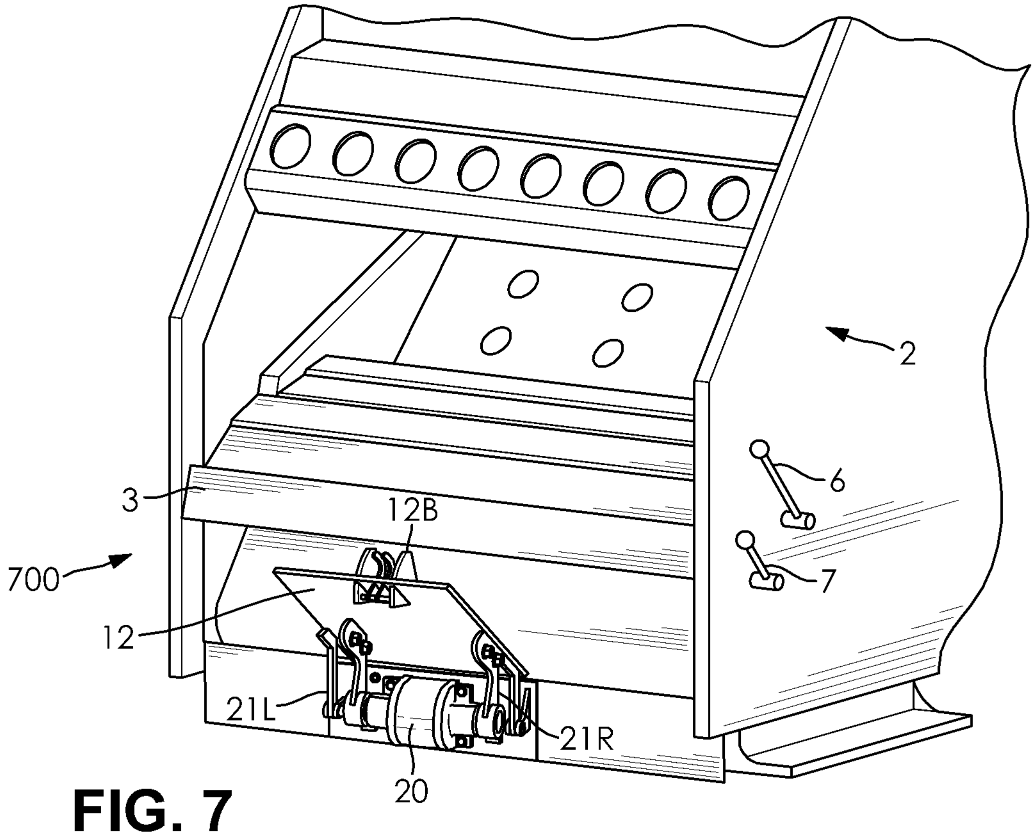
FIG. 7 (PRIOR ART)
FIG. 7 is a prior art view of the cart tipper mounted on a waste truck similar to FIG. 4 but showing the cart tipper moving toward the up position with the packer blade not retracted such that both the cart tipper and the packer blade are in the collision zone.

FIG. 7 is a prior art view 700 of the cart tipper 12 mounted on a waste truck 2 showing the cart tipper 12 moving toward the second, up position with the packer blade 3 not retracted such that both the cart tipper 12 and the packer blade 3 are in the collision zone and are about to collide.

Figure 1A:
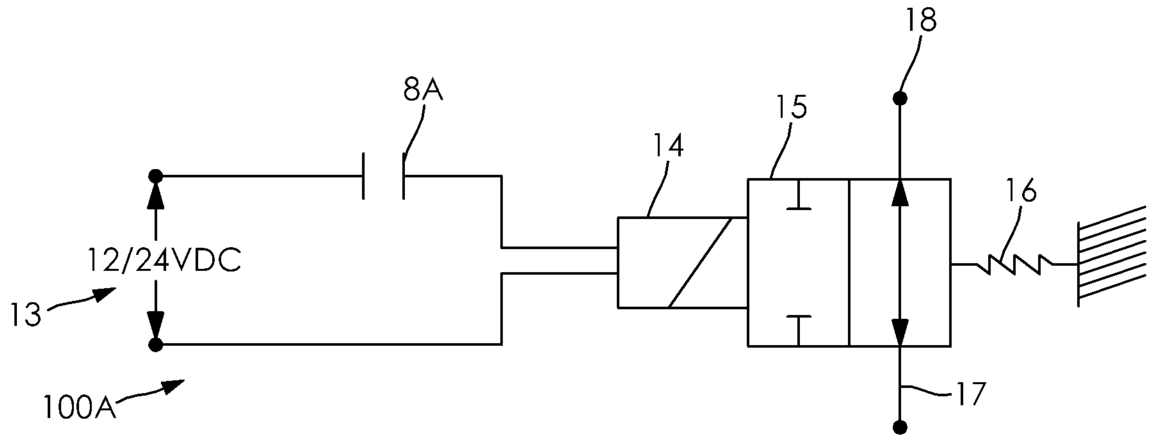
FIG. 1A is a schematic electrical diagram of the proximity sensor contacts in the open position, the solenoid coil, and the solenoid operated valve.
Figure 5:
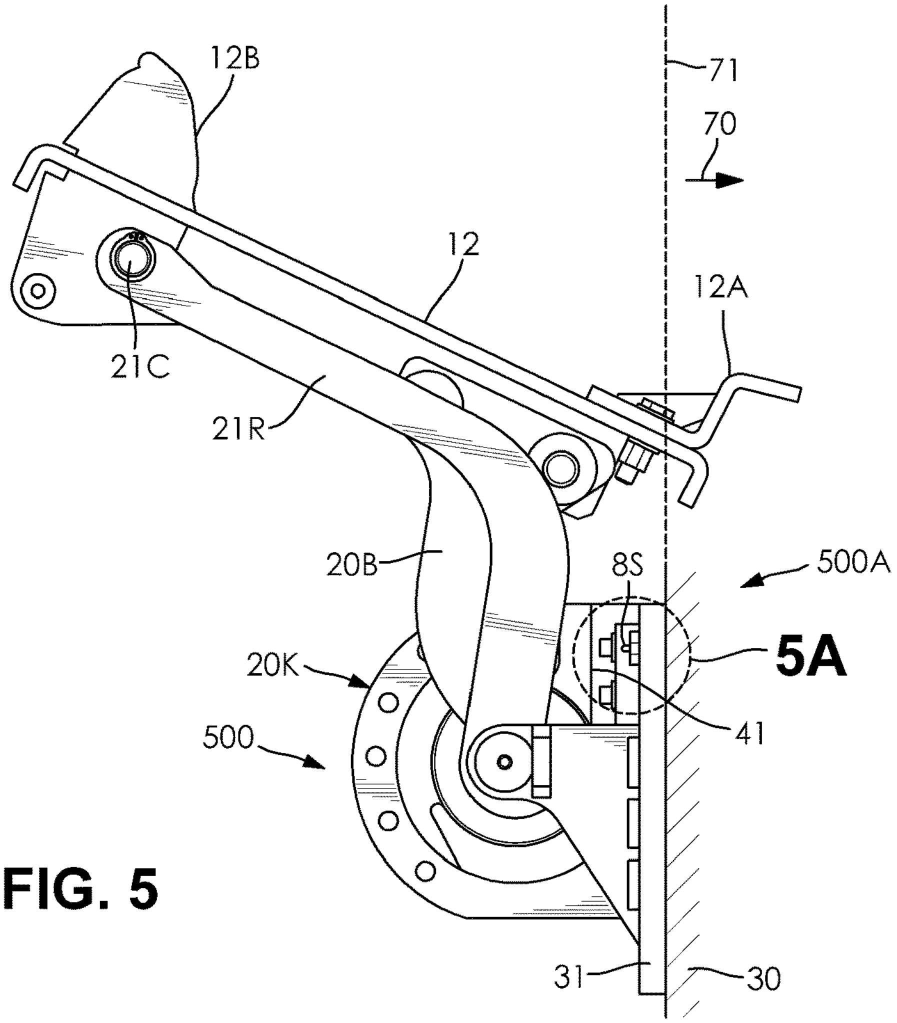
FIG. 5 is a right-side view of the cart tipper approaching the second, uppermost rotational position where the tipper is within the collision zone as it has broken the plane of the mounting plate.

FIG. 1A is a schematic electrical diagram 100A of the proximity sensor 8S contacts 8A in the open position, the solenoid coil 14, and the packer blade hydraulic interrupt valve 15 which is a solenoid 14 operated valve 15. The valve 15 is interchangeably referred to as the packer blade hydraulic interrupt valve 15. With the contacts 8A open in this example, the input voltage 12/24 Vdc is not applied across the solenoid 14 and the plunger (not shown) of the solenoid does not move and the fluidic conductivity to the packer blade cylinders (not shown) is maintained. The packer blade hydraulic interrupt valve 15 is preferably a 2-port/2-position, solenoid operated 14, spring 16 return valve. Other hydraulic interrupt valves may be used. In FIG. 1A, the packer blade hydraulic interrupt valve 15 is in the first position with the solenoid coil deenergized. The packer blade hydraulic interrupt valve 15 is illustrated with a pressure supply source 17 feeding a pressure supply load 18. The pressure supply load 18 is the supply to a piston (s) (not shown) that operates the packer blade 3. In the position as shown in FIG. 1A, the cart tipper is operable in the safe condition as it is not in danger of colliding with the packer blade 3 because it is not near the collision zone. By "not near the collision zone" it is meant that the cart tipper 12 is more than a prescribed amount of rotation measured in degrees away from the uppermost rotational position. The important point being that the cart tipper is not in the collision zone/danger zone 70. The collision zone/danger zone 70 begins when any portion of the cart tipper 12 breaks the imaginary mounting face/plane 71 of the mounting plate 31 of the cart tipper 12. It is the vertical plane 71 of the mounting plate 31 that defines the collision zone/danger zone and FIG. 5 illustrates the cart tipper 12 partially in the collision zone. See FIGS. 5, 5B, 10A, and 10B which illustrate the collision zone 70 as everything to the right of the imaginary plane 71 formed by the vertical extension of the mounting plate 31.

Referring to FIG. 5, the face/plane defined by the plane of mounting plate 31 defines the collision zone and FIG. 5 illustrates a portion of the cart tipper 12 entering the collision zone 70. Depending on the center of rotation of the cart tipper, and the geometry of the rotary actuator driving the mechanism, the angular rotation of the cart tipper 12 within the danger zone/collision zone 70 may extend 30° or more from the uppermost rotational position or it may be some other number depending on the geometry and structure of the drive mechanism of the cart tipper. On some structures, the range of rotation of the cart tipper may be far greater than 30 degrees from the uppermost rotational position of the cart tipper depending on the geometry and structure of the drive mechanism of the cart tipper. The range of rotation in degrees as used herein is the rotation about a center point of a drive shaft of a rotary actuator or it is the rotation about the center point of some other structure, that is measured by the uppermost position of the rotary actuator and the plane of the mounting plate 31 which defines the boundary of the collision zone/danger zone.

Figure 5A:
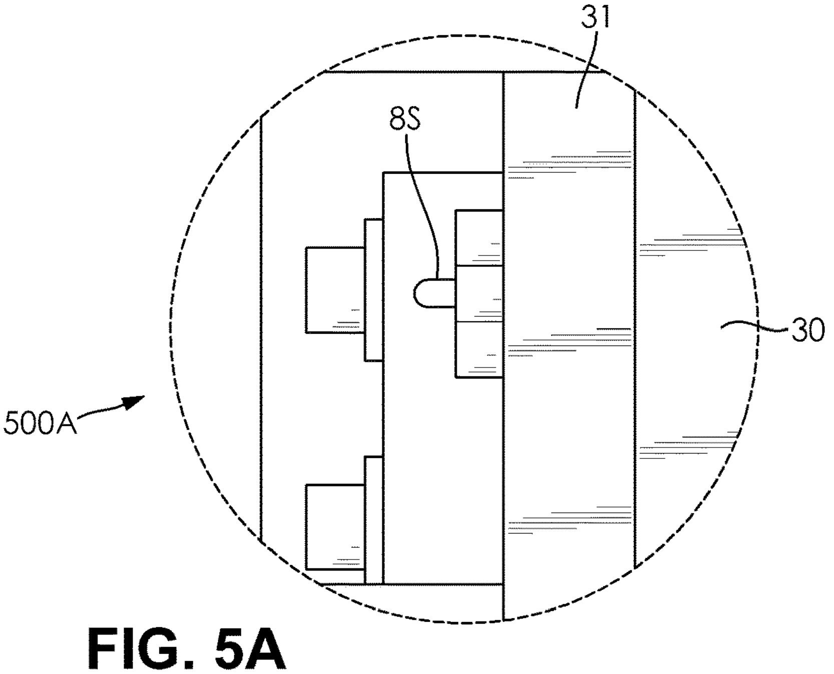
FIG. 5A is an enlargement of a portion of the right-side view of the cart-tipper of FIG. 5 illustrating the proximity sensor.
Figure 5B:
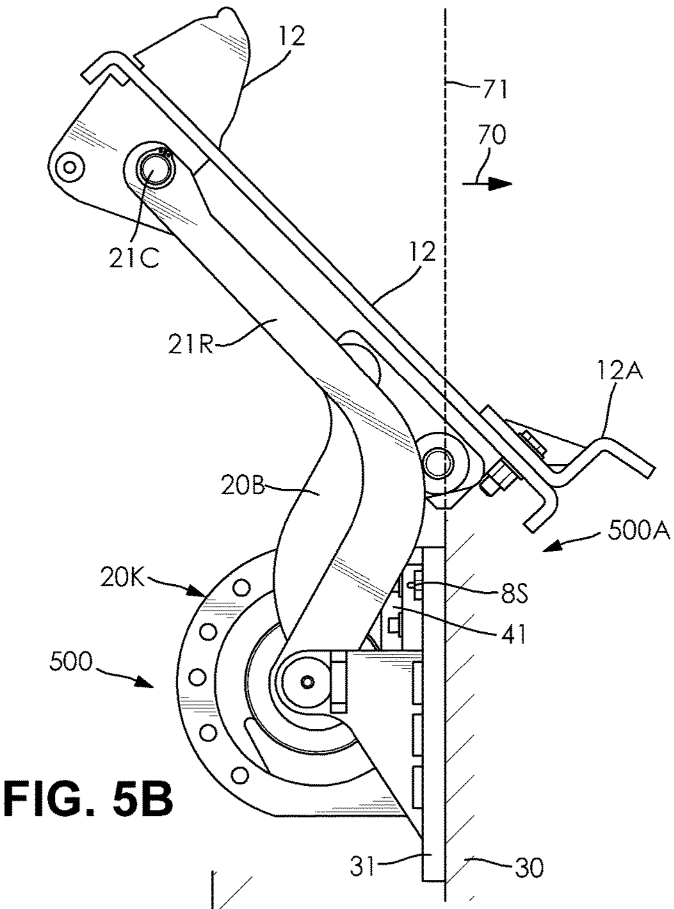
FIG. 5B is a right-side view of the cart tipper in the second, uppermost rotational position where the container is dumped.

The uppermost rotational position means that the cart tipper 12 is fully rotated in the clockwise direction when viewed in FIG. 5B. The collision zone 70 starts when the cart tipper 12 breaks the vertical plane of mounting plate 31 as it rotates from the first, lower position to the second, upper most position. The range of rotation starts when the cart tipper breaks the vertical plane and continues until the cart tipper reaches the uppermost rotational position. It is specifically contemplated herein that it is possible to define other positions for the collision zone other than the mounting plate plane. Another structural example would be to have a long reach of the cart-tipper over into the hopper (receptacle of the waste truck) and therefore the collision zone would not be set at the mounting plane.

The percent travel is not necessarily the best expression for representing the collision zone 70 nor is the mounting plane always being the defining point for the start of the collision zone. Only the angular position of the rotary cart tipper relative to the full-dump position (uppermost rotational position) of the rotary cart tipper matters in defining the collision zone. The collision zone is defined as the three-dimensional space whereby the tipper device and packer blade overlap. The collision zone 70 is the space to the right of imaginary plane 71 and the degrees of rotation about the point of the rotation is measured as the arc of rotation from the rotational angle where the cart tipper first crosses the imaginary plane 71 to the uppermost rotational position of the cart tipper in the clockwise direction.

In some examples or embodiments of the invention, it may be desirable to detect the position of the cart tipper 12 before it enters the collision zone 70 to prevent any possibility of a collision between the cart tipper and the packer blade or also to prevent the collision of the waste can the cart tipper is picking up from colliding with the packer blade. In other words, as the cart tipper approaches the imaginary plane 71, the sensor 58 detects and acts to inhibit further rotation of the cart tipper or waste can so that it stays out of the collision zone. A further explanation of this follows hereinbelow.

Figure 3:
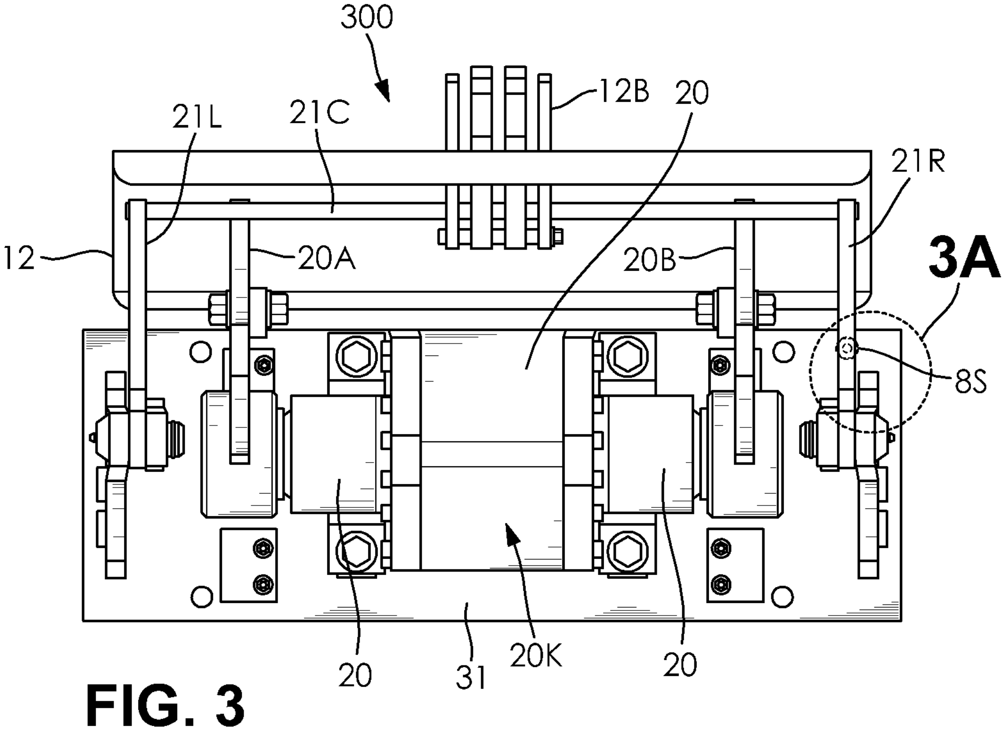
FIG. 3 is a front view of the cart-tipper in the up or dumping position.

FIG. 3 is a view of the cart-tipper 12 looking from the rear of the garbage truck in the uppermost rotational or dumping position.

Figure 2:
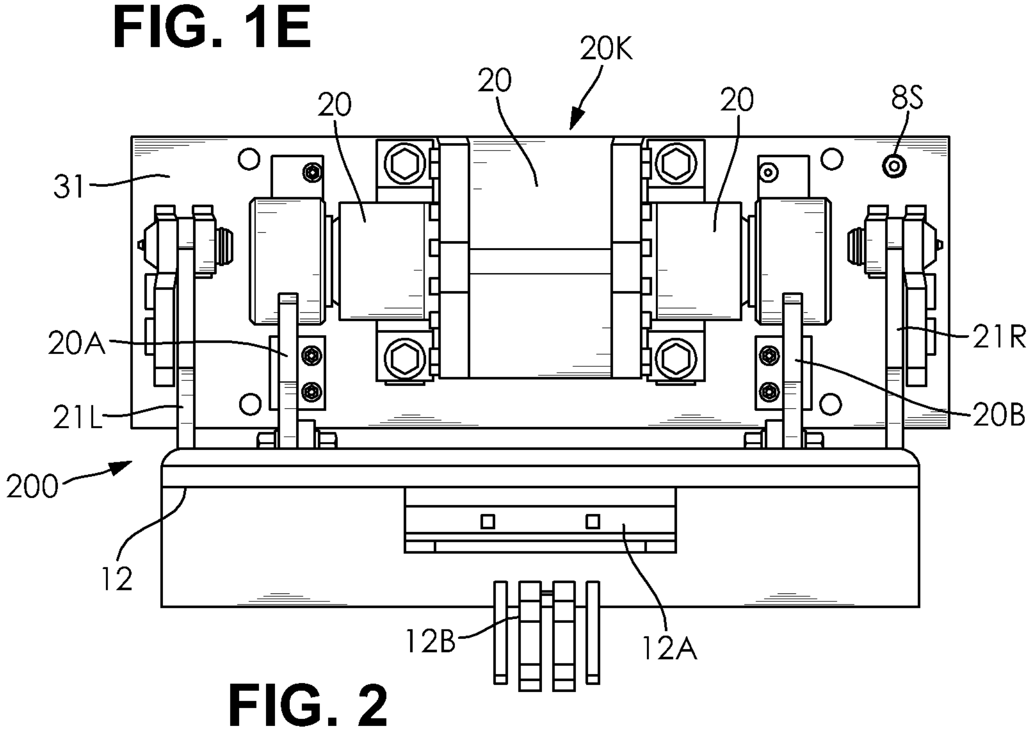
Figure 6:
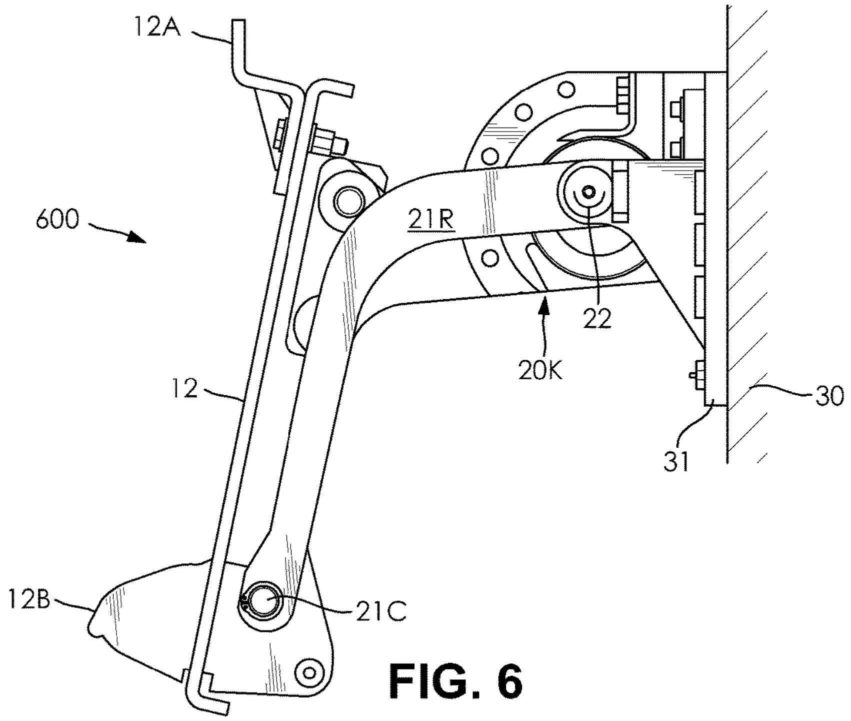
FIG. 6 is a right-side view of a cart tipper not in the collision zone illustrating the rotary potentiometer for detecting a range of rotary motion.

FIG. 2 is a front view 200 of the cart tipper 12 in the first, lower position (down position for receiving the trash can, trash container or just the container). In the position of FIGS. 2 and 6, the container (not shown) is affixed to the cart tipper 12. In FIGS. 2 and 6, the customer's trash container (not shown) is mounted on the cart tipper 12 by a waste collection person, sanitation engineer, or waste management professional slightly lifting the container against the upper support 12A and trapping it in place while engaging the metal bar of the container (not shown) with the gripper 12B which clasps the cylindrical bar of the container. The engagement of the gripper 12B with the bar is not shown but happens when the rotation of the cart tipper 12 occurs. The container is not shown for clarity of the invention. The waste collection person positioning the receptacle in the can to the lift hook/saddle 12A of the tipper is also not shown. The gripper 12B is actuated by the central arm 21C of the cart tipper 12 shown in the various drawings and is actuated by the rotary movement of the actuator 20K mounted to the plate 31 which in turn is mounted to a flat surface 30 of the truck 2.

Figure 3A:
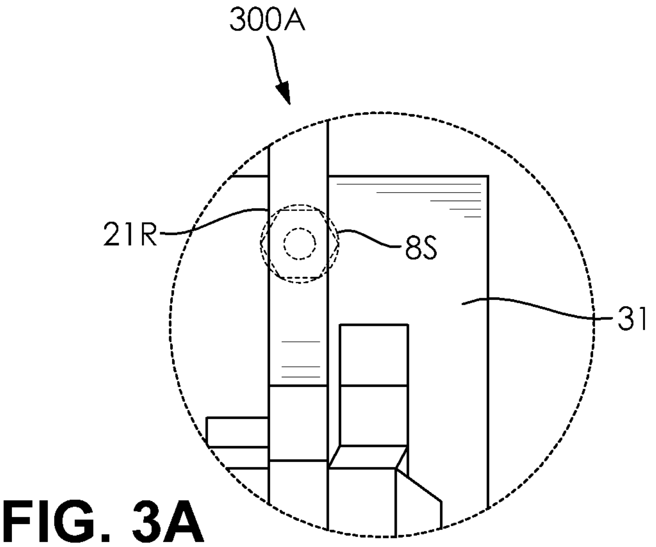
FIG. 3A is an enlarged view of FIG. 3 illustrating one example of the proximity sensor.
Figure 4:
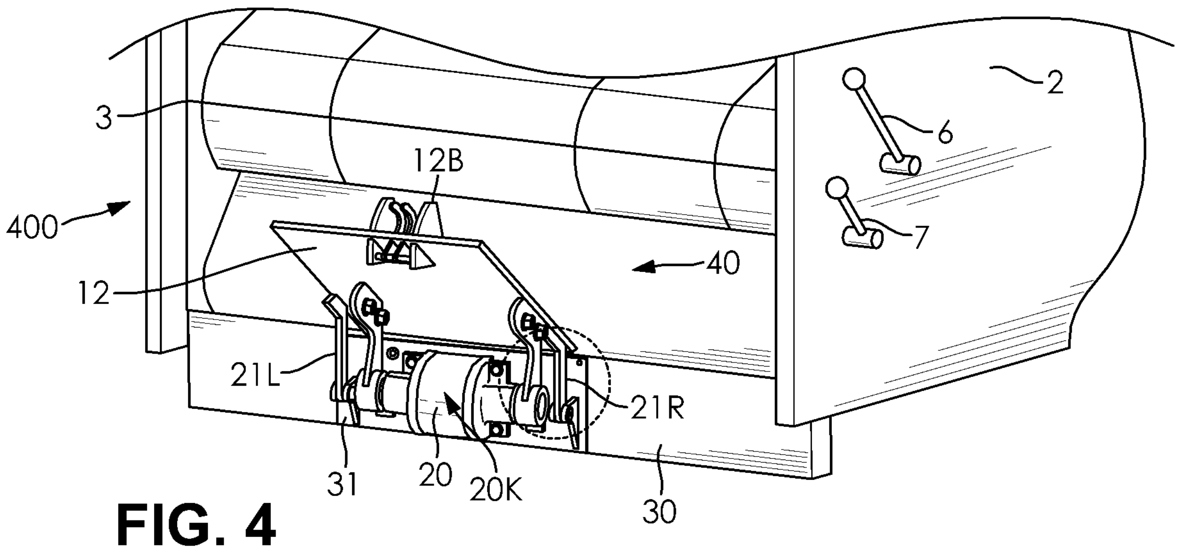
FIG. 4 is a perspective view schematic view of the cart-tipper mounted on a waste truck showing the cart tipper moving toward the second, upper position with the packer blade retracted enabling room for garbage to be dumped in the garbage truck.

Still referring to FIG. 2, a rotary actuator 20 includes drive arms 20A, 20B both of which are affixed to the cart tipper 12 on the side opposite to the upper support 12A and the gripper 12B. Drive arms 20A, 20B drive the cart tipper 12 from the first, lower position shown in FIG. 2 to the second, upper position shown in FIG. 3. FIG. 3A is an enlarged view 300A of a portion of FIG. 3 illustrating the proximity sensor 8S mounted on the flat plate 31. Flat plate 31 is mounted onto the surface 30 of the truck 2 as best viewed in FIG. 4. Proximity sensor 8S is shown schematically and can be chosen from several types of proximity sensors depending on the materials of construction of the cart tipper 12 and the range of the proximity sensor coupled with the required activation range of the cart tipper 12. Some sensors only sense ferromagnetic materials and other sensors will sense non-ferrous materials. Usually the drive arms 20A, 20B and the guide arms 21L, 21R are made of a ferrous based steel. The desired activation range is before the cart tipper reaches the collision zone, to wit, before the cart tipper breaks the plane of mounting plate 31. As stated above, the collision zone may not be tied directly to the mounting plane of the tipper. The range of rotary motion within the collision zone may be, for instance, more or less than 30°, that is the uppermost rotational position for dumping as illustrated in FIGS. 3, 4 and 5. FIG. 5B illustrates the cart tipper 12 in its uppermost rotational position. All of the geometry is being shown by way of example only and can be very significantly different based on the needs of the customer.

The proximity sensor 8S may be located in a multiplicity of locations instead of sensing in proximity to the tipper lift iron pieces (21R, 21L) which may become bent/damaged. Instead, other locations may be chosen to keep the placement of the sensor within the actuator itself (for example, between rotary actuator 20K and coupling 20B) to increase reliability. Sensing of the lift iron parts (21R, 21L) may have a larger failure mode/rate because the lift iron pieces (21R, 21L) may become damaged and bent from a variety of means—when that happens the reliability of their positional location being repeatable is diminished. Therefore, positioning the sensor 8S to detect the more rigid and protected parts of the cart tipper such as within the actuator itself or in connection with the strongest components of the cart tipper will yield a greater robustness. Actually, the sensor 58 is mounted within the actuator itself for some of these same reasons. Sensor 58 is protected from impacts and debris, and the shaft and sensor are protected from corrosion and the tolerance maintained between the two relative parts are significantly more accurate and robustly maintained.

Still referring to FIG. 2, the proximity sensor 8S is illustrated in the upper right end corner of flat plate 31. As placed in FIG. 2, the proximity sensor 8S measures the position of guide arm 21R. Guide arm 21R may be of a ferrous or non-ferrous material and a suitable proximity sensor 8S is selected. Additionally, other parts of the tipper lift iron mechanism could also have the position sensed and correlated to the collision zone. The proximity sensor 8S has electronics not shown which actuate the contacts in FIGS. 1A and 1B, or the proximity sensor drives the base of the transistor 8C in FIGS. 1C and 1D. Or the proximity sensor is a rotary potentiometer 22 and drives the base voltage of the transistor 8C as illustrated in FIG. 1E. Also, see FIG. 6 which illustrates the potentiometer 22 diagrammatically.

Capacitive proximity sensors can detect both metallic and non-metallic targets. The capacitive proximity sensors use the variance in the capacitance of the sensor to determine whether an object has been detected. A capacitive sensor is based on an electrical field produced across capacitor plates and can be used to detect all materials. Capacitive sensors like the inductive sensors have a relatively low operating distance (i.e., low operating ranges (distances)), so the material sensed must be relatively close to the sensor.

An inductive sensor uses current induced by magnetic fields to detect nearby metal objects. Inductive proximity sensors are useful to detect the metallic object which is present next to their active side. This sensor operates under the electrical principle of inductance, that is, a fluctuating current induces an electromotive force (EMF) in a target object. Inductive proximity sensors detect ferrous materials as targets.

An optical proximity sensor employs a light source, and a sensor that detects the light. These sensors detect objects directly in front of them by utilizing the sensor's own transmitted light reflected back from an object's surface. An optical sensor converts light into an electrical signal and can detect all materials not just metals. One advantage of the optical sensors is that they have a larger range of operation as compared to inductive sensors and they are easier to install with a wider range of targets to sense. Further, optical sensors have relatively large ranges and can detect many types of materials. Consequently, waste which often spills out can inadvertently trip the system to halt the packer blade from moving when not desired.

A magnetic proximity sensor such as a hall sensor uses magnets and its field to detect magnetic material and it has a larger operating distance than inductive and capacitive sensors. The presence of a magnetic object, commonly referred to as the target, is sensed. The target, characterized by its magnetic field, triggers the switching process when the target enters the detection range of the sensor.

An ultrasonic proximity sensor may be based on an ultrasonic source and receiver in the same device. Ultrasonic sensors emit an ultrasonic pulse which is reflected by objects in its path and the reflected wave enters a sonic cone. Ultrasonic sensors employ sound waves to detect objects. Ultrasonic sensors have large ranges of operating distances and can be used with many types of target materials. An inclinometer/angle sensor could also be employed in this application. Again, the inclinometer is not as robust as the ground plane is not always flat when in use.

Guide arms 21L, 21R are also affixed to the gripper 12B of the cart tipper 12 on the side opposite to the upper support 12A and the gripper 12B. By way of example, guide arms 21L, 21R rotate about 100° between the lowest position when the container is loaded on the cart tipper as illustrated in FIG. 6 (fully down position) and the uppermost rotational position of the cart tipper 12 as shown in FIG. 5B.

Figure 1B:
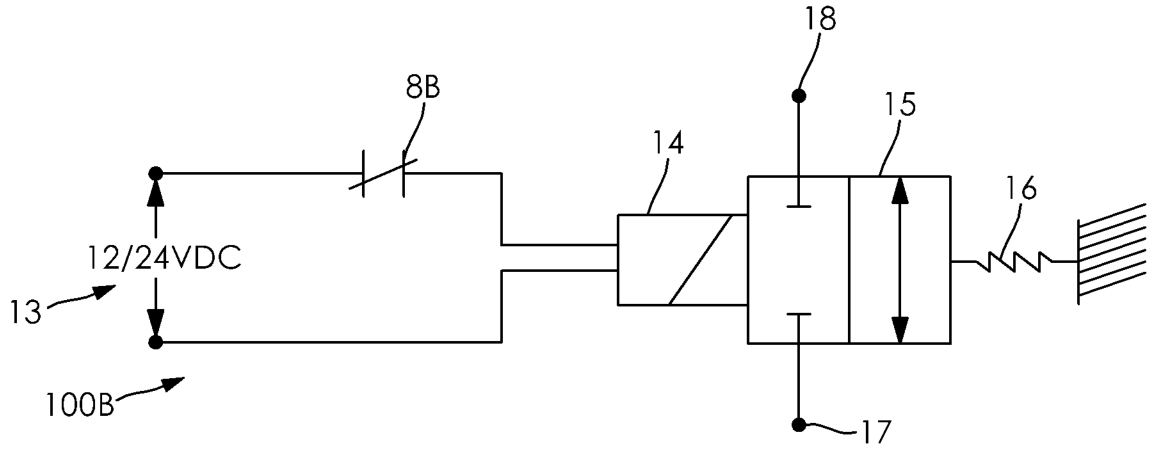
FIG. 1B is a schematic electrical diagram similar to FIG. 1A with the proximity sensor contacts in the closed position, the solenoid coil and the solenoid operated valve.

FIG. 1B is a schematic electrical diagram 100B similar to FIG. 1A with the proximity sensor contacts 8B in the closed position, the solenoid coil 14 and the solenoid operated valve 15 in its second position indicating that the pressure source 17 is isolated from the pressure load 18. FIG. 1B is the circumstance wherein the proximity sensor 8S has detected the presence of the tipper cart in the collision zone, that is, within 30° of full rotation of the tipper cart. Other ranges may be used which are much larger or smaller than 30°. The collision or interference zone may be adjustable as there is a lot of variation in garbage truck bodies and mounting relationships of the cart tipper to the body. Upon detection the contacts 8B close as shown in FIG. 1B energizing the solenoid coil 14 with the 12/24 Vdc power supply 13. When in the collision zone, movement of the packer blade is disabled by moving the solenoid operated packer blade hydraulic interrupt valve 15 to its second position when the contacts 8B are closed.

Figure 1C:
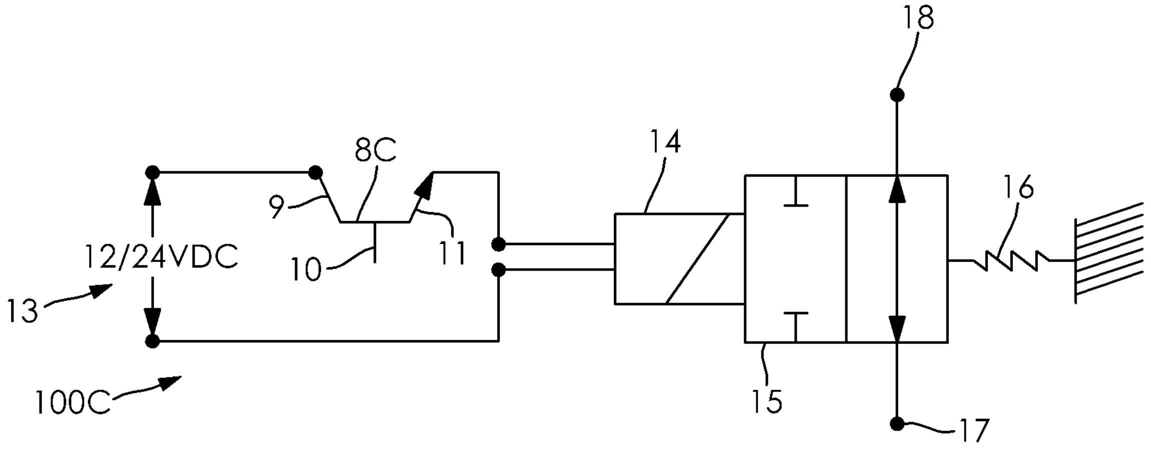
FIG. 1C is a schematic electrical diagram of an unactuated proximity sensor, the solenoid coil, and the solenoid operated valve.
Figure 1D:
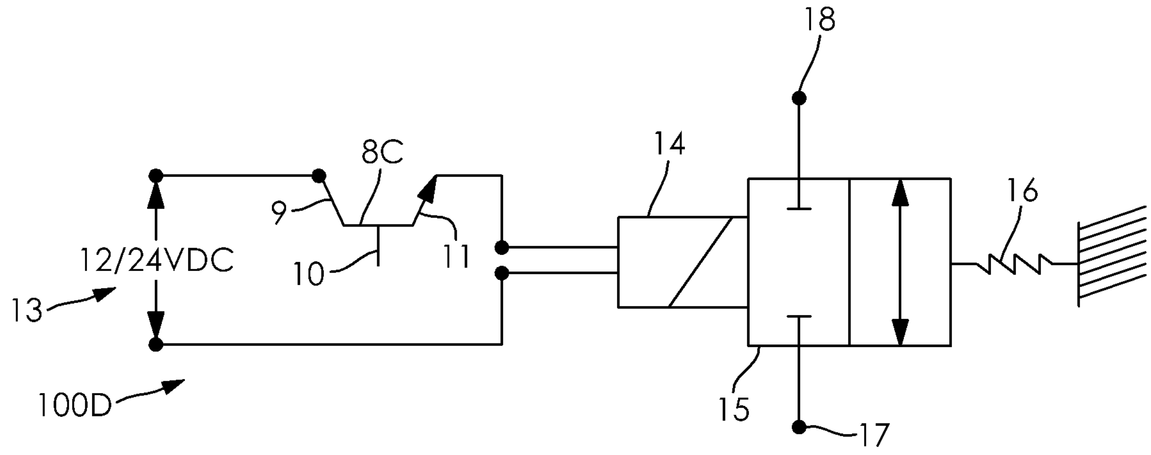
FIG. 1D is a schematic electrical diagram of an actuated proximity sensor, the solenoid coil and the solenoid operated valve.
Figure 1E:
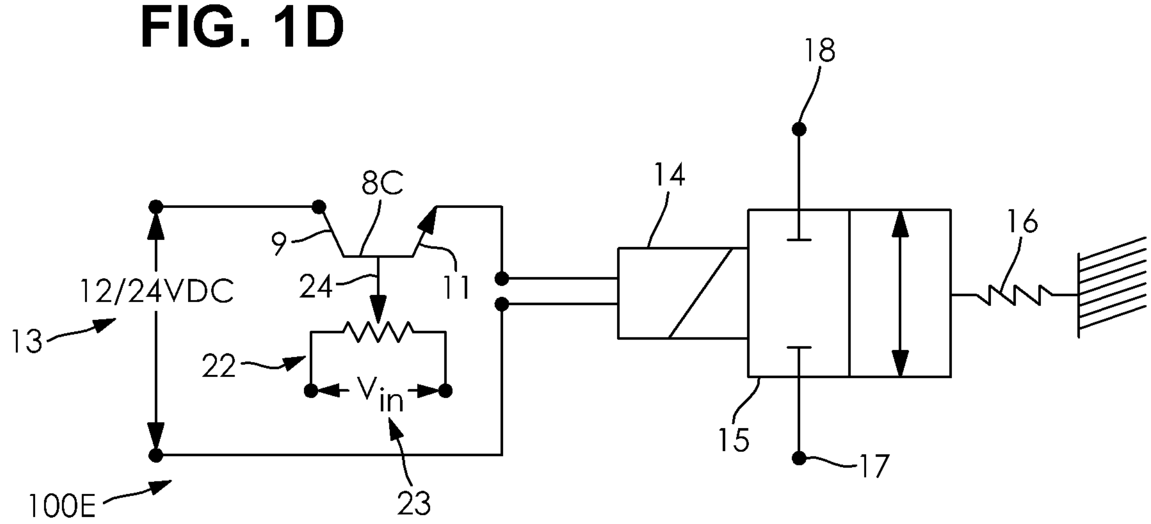
FIG. 1E is a schematic electrical diagram of a rotary potentiometer driving the transistor when the rotary potentiometer senses the cart tipper in the up position.

FIG. 1C is a schematic electrical diagram 100C of an unactuated proximity sensor 8C, the solenoid coil 14, and the solenoid operated valve 15. The proximity sensor may be of any suitable type that outputs or is made to output a sufficiently large voltage on line 10 interconnected with the base of the transistor. Reference numeral 9 is the collector and reference numeral 11 is the emitter. When a sufficiently high base voltage on line 10 exists, current flows from the collector through the base of the transistor and to the emitter and the solenoid coil 14 which energizes the coil causing the plunger (not shown) to move as shown in FIG. 1D. FIG. 1D is a schematic electrical diagram 100D of an actuated proximity sensor 8C, the solenoid coil 14 energized and the solenoid operated valve 15 moved to its second position prohibiting hydraulic fluid to pass from the hydraulic source 17 to the hydraulic load 18.

FIG. 1E is a schematic electrical diagram 100E of a rotary potentiometer 22 driving the base of the proximity sensor/transistor 8C when the rotary potentiometer 22 senses the cart tipper 12 in the collision zone, for example, within 30° of the fully up position. Other ranges may be used which are much larger or smaller than 30°. The rotary potentiometer 22 is also shown diagrammatically in FIG. 6 wherein the wiper (not shown in this view) detects the rotational position of the cart tipper 12. FIG. 6 is a right-side view of the cart tipper 12 illustrating the rotary potentiometer 22 for detecting a range of rotary motion of the cart tipper 12. In FIG. 6, the cart tipper 12 is not in the collision zone.

Referring to FIG. 1E, the rotary potentiometer 22 includes wiper 24 that supplies voltage to the base of proximity sensor 8C. Wiper 24 picks a portion of the input voltage, Vin from the resistance along the rotational path of the wiper 24 in typical voltage divider fashion. When a sufficiently large voltage is applied to the base of the transistor 8C by the wiper 24, current is conducted from the collector 9 to the emitter 11 and then to the solenoid coil 14 permitting movement of the plunger of the packer blade hydraulic interrupter valve 15 to the second position prohibiting communication of the hydraulic source 17 to the hydraulic load 18. As shown in FIG. 1E, the packer blade hydraulic interrupter valve 15 is in the second position prohibiting communication between the pressure source 17 and the pressure load 18. In other words, as shown in FIG. 1E the cart tipper 12 if the 17-to-18 path is blocked, the tipper must be in the collision zone.

FIG. 4 is a perspective view 400 of the cart tipper 12 mounted 31, 30 on a waste truck showing the cart tipper 12 rotating about its axis of rotation and moving toward the second, up position with the packer blade 3 retracted creating space 40 for receiving more refuse/garbage in the truck 2. A close inspection of FIG. 4, reveals that not all portions of the guide arms 21L, 21R are shown on the side of the cart tipper 12 as shown. Guide arms 21L, 21R rotate about 100° between the lowest position when the container is loaded on the cart tipper as illustrated in FIG. 6 (fully down position) and the upper most position of the cart tipper 12 as shown in FIG. 5B. Also, the central arm 21C shown in FIGS. 3, 5, and 6, actuates the gripper 12B which grips a bar (not shown) on the container (not shown) to secure the container to the cart tipper 12 which is rotated which causes the lid of the container to open and the refuse slides out of the container and into the space 40 within the truck. While this diagram and tipper system works in this manner, it will be apparent to those skilled in the art, given the teachings herein, that there are other means by which cart tipper mechanisms work.

Figure 4A:
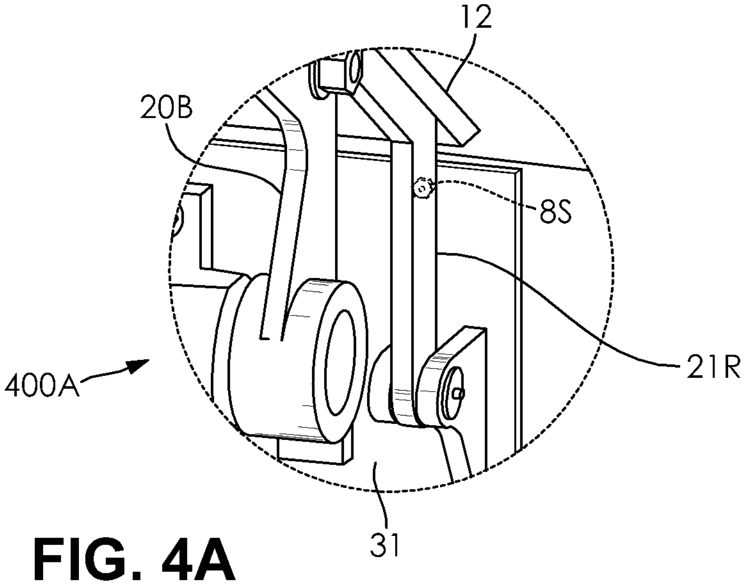
FIG. 4A is an enlarged view of a portion of FIG. 4 illustrating one example of the proximity sensor.

FIG. 4A is an enlarged view 400A of a portion of FIG. 4 illustrating the proximity sensor 8S (not shown to scale in this view). In FIGS. 4 and 4A, the cart tipper 12 has been rotated by drive arms 20A, 20B toward the second, upper most position for dumping the container (not shown). Guide arm 21R is shown approaching the proximity sensor 8S flush mounted on flat plate 31. The proximity sensor can be oriented in another way other than flush mounting. For instance, it may be built up or extended nearer the guide arm 21R. In another embodiment, the proximity sensor may be self-contained within the actuator 20 or between the actuator 20 and the drive arms 20A or 20B. Further, instead of using guide arm 21R as the target for the sensor, one of the drive arms 20A, 20B can be used as the target and the proximity sensor 8S would have to be brought into proximity with the drive arm 20A, 20B being sensed. Yet further, a tensioning device such as a spring may be used to measure the proximity of the guide arms 21L, R and the mounting plate 31.

FIG. 5 is a right-side view of the cart tipper approaching the second, uppermost rotational position where the cart tipper is within 30° of the uppermost rotational position of the cart tipper. Other ranges greater or lesser than 30° may be used. FIG. 5A is an enlargement 500A of a portion of the right-side view of the cart tipper of FIG. 5 illustrating the proximity sensor 8S in proximity to the right guide arm 21R as indicated by arrow 41. FIG. 5B is a right-side view 500B of the cart tipper 12 in the second, uppermost rotational position where the container is dumped. The container may be dumped in the position of FIG. 5 (with the container approaching the uppermost rotational position) and/or FIG. 5B (with the container in the uppermost rotational position).

When the arm 21R is in sufficient proximity to the proximity sensor 8S: (1) actuation of the contacts as illustrated in FIG. 1B occurs by means not shown; or, (2) actuation of the transistor 8C in FIG. 1D by application of a sufficient voltage to the base of the transistor by means not shown. The rotary potentiometer 22 is also shown diagrammatically in FIG. 6 wherein the wiper (not shown in this view) detects the rotational position of the cart tipper 12 and provides sufficient voltage to the base of transistor 8C to permit actuation of the solenoid coil 14 shuttling the packer blade hydraulic interrupt valve to its second position as illustrated in FIG. 1E.

Components of the invention include, amongst other components, a cart tipper position proximity sensor 8S and a packer blade hydraulic interrupt valve 15. When the cart tipper is in the collision zone, the cart tipper's rotational position is sensed by a proximity switch (rotary potentiometer 22, linear potentiometer, magnetic or inductive, or other proximity sensor). The packer blade hydraulic circuit 17, 18 includes the packer blade hydraulic interrupt hydraulic valve 15. The range of the proximity may be different and/or adjustable depending on the particular cart tipper in use and depending on the design of the particular rear load garbage truck on which the tipper is mounted. While the description herein is for rear load trucks as it is the primary means by which this system is used, the teachings herein are applicable to a side load truck for example. Reference numeral 17 denotes a hydraulic pressure source and reference numeral 18 represents a hydraulic load such as a cylinder(s) which drive(s) the hydraulic packer blade 3.

The packer blade hydraulic interrupt valve 15 is preferably a 2-port/2-position, solenoid operated, spring return valve. The packer blade hydraulic interrupt valve 15 is in the existing hydraulic loop (not shown) of the packer blade 3. The packer blade hydraulic interrupt valve 15 is just prior to the port that communicates with the packer blade 3 controls and valves.

In the embodiment of FIGS. 1A and 1B, when the cart tipper 12 is in the lowered, first position, to receive a cart, dumpster or container, the proximity sensor 8S will not sense the presence of the cart tipper 12. In other words, in one embodiment, the proximity sensor 8S has contacts which are normally open as illustrated in FIG. 1A. Whenever the cart tipper 12 rotates up and is within the collision zone the proximity sensor 8S will be active and the contacts 8B will be closed as shown in FIG. 1B.

While the cart tipper proximity sensor 8S is not actuated and the cart tipper 12 is below (not yet reached) the final 30° of upward rotation, the contacts 8A of the proximity sensor 8S are open, the packer blade 3 will be freely operated and it may move freely within in its' normal range of motion.

The packer blade scoops and pulls the refuse into the garbage truck compacting the garbage so that more refuse can be held by the truck. The packer blade hydraulic interrupt valve 15 will not impede the blade's motion in anyway when the cart tipper 12 is not in the collision zone.

Instead of specifying a certain specific degree of motion such as 30°, the 'collision zone' description may be used.

Still referring to the embodiment of FIGS. 1A and 1B, whenever the cart tipper proximity sensor 8S is active and the proximity sensor 8S contacts 8B are closed, the proximity sensor will activate the solenoid on the packer blade interrupt valve 15, which will then prevent the flow of hydraulic fluid to and from the packer blade's actuation cylinder(s) (not shown). This will cause the packer blade 3 to remain in its then current position.

The invention, among other things, interconnects two currently independent systems on a refuse vehicle to prevent damage from the objects within each system from having a collision while in operation. The cart tipper 12, shown as in the full down position in FIG. 2, for example, the stowed position and in the full up position, for example, the dump position, as illustrated in FIG. 3, and the packer blade 3 both operate by the energy provided by the hydraulic system of the vehicle. The cart tipper's hydraulic actuation is manually controlled by an operator through a hand control valve 7. The packer blade actuator is manually controlled by an operator through a hand control valve 6 which opens hydraulic fluid flow into the hydraulic lines/circuit (not shown) which in turn actuates the cylinders (not shown) that move the packer blade 3. It should also be noted that the packer blade 3 can also be actuated by an operator through another means elsewhere on the vehicle, for example, the driver in the cab of the refuse vehicle can also actuate the packer blade 3. This makes a collision between the blade 3 and the cart tipper 12 in the up position even more likely because if the truck driver actuates the cart tipper 12 then the truck driver might not be able to see the status of the back of the truck, and, in particular the position of the packer blade 3 and the position of the cart tipper device 12.

The cart tipper device 12, has an electric proximity sensor 8S integrated into the device that can monitor the position of the cart tipper 12 between the first, full down/stowed loading position and the second, full up/dump position. Alternatively, instead of an electric or electronic proximity sensor the proximity sensor may be a mechanical switch activated by the guide arms 21L, 21R or by the drive arms 20A, 20B. Additionally, a spring type switch may be used as the proximity sensor which measures and senses position determined by the spring constant and force of deflection. Within the range of movement of the cart tipper 12 there is a position which as the cart tipper 12 approaches, but not fully reaching, the up/dump position that a portion of the cart tipper device enters a position in space at which the packer blade 3 can also occupy during its independent range of motion. The zone at which both devices overlap is an interference or 'collision zone'.

To prevent damage due to an interference collision of the cart tipper 12 and packer blade 3, the proximity sensor or proximity sensors 8 sense the position of the cart tipper device 12 and isolate the packer blade. Proximity sensor(s) 8S monitor the cart tipper 12 position and isolate the packer blade when the cart tipper 12 enters a position which represents the 'collision zone'. The packer blade will be maintained in isolation (not moving) until the proximity sensor(s) 8 register that the cart tipper 12 is not within the prescribed 'collision zone', for instance it is more than 30° (by way of example only) away from its upper most position.

There are several different methods for the control of the cart tipper 12 and the packer blade 3 wherein their operation is coordinated and synchronized as described herein. There are various electrical proximity sensor types and switches that can be used and placed in multiple locations for registering the cart tipper position as set forth herein.

There are several different hydraulic valve types for controlling the fluid flow to the packer blade 3 hydraulic drives. There are also multiple locations in the hydraulic system in which the valve(s) can be placed.

It is conceivable that an entirely hydraulic, or pneumatic solution using only fluidic controls with no electrical sensors or switches could be used to prevent operation of the packer blade under certain circumstances. Similarly, a system of an entirely electrical solution using only electrical signals and actuation is disclosed hereinbelow.

Figure 8:
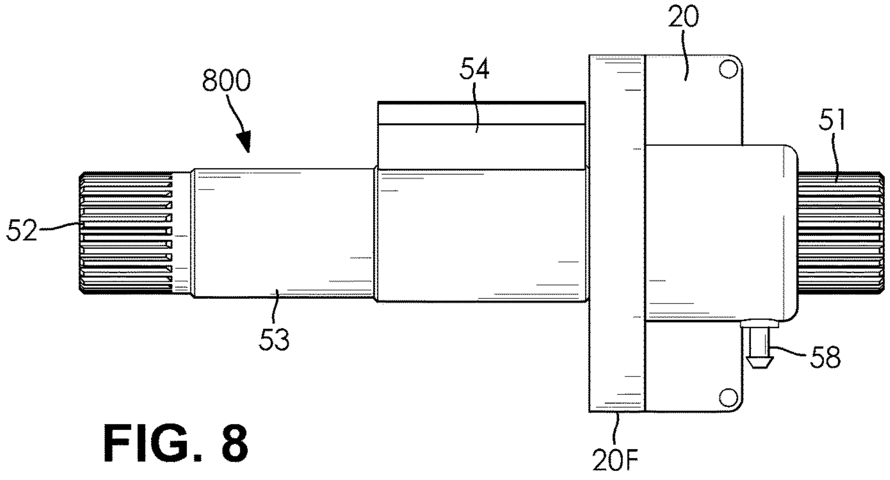
FIG. 8 is a front view of the shaft and housing of a rotary actuator of a cart tipper with the inductive sensor mounted in a portion of the housing.

FIG. 8 is a front view 800 of the shaft 53 and a portion of the housing 20 of a rotary actuator 20K of a cart tipper 12 with the inductive proximity sensor 58 mounted in the portion of the housing 20. Shaft 53 is preferably made of steel for enhanced detection by the inductive proximity sensor 58. The shaft material is selected from the group consisting of steel, stainless steel, brass, aluminum and copper. Steel is best and has a unitary correction factor of 1.0, stainless steel has a correction factor of 0.7, brass has a correction factor of 0.4, aluminum has a correction factor of 0.4, and copper has a correction factor of 0.3.

Splined end portions 51, 52 of the shaft 53 support drive arms 20A, 20B driven by the rotary actuator 20K to move the cart tipper 12 between the first, lower position and the second, upper position and vice-versa. Vane 54 is integral to the shaft, the shaft starts as a rough forging that includes the vane portion on the shaft 53, and it is this vane 54 which has pressure exerted upon it for operation of the rotary actuator 20K.

Figure 9:
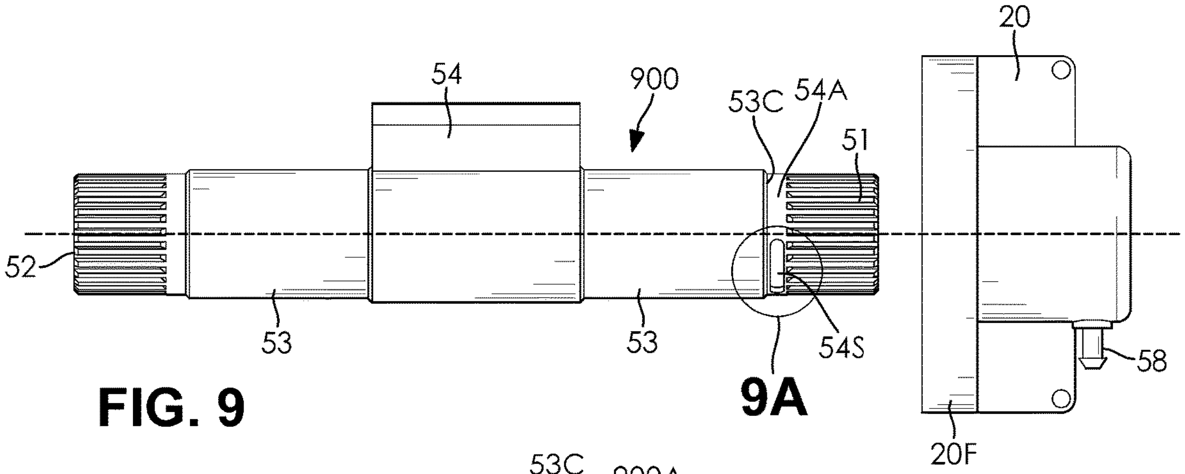
FIG. 9 is an exploded view of FIG. 8 illustrating the shaft of the rotary actuator and the arcuate slot in the shaft.

FIG. 9 is an exploded view 900 of FIG. 8 illustrating the shaft 53 of the rotary actuator 20K (shown in FIG. 10A) and the arcuate slot 54S in the steel shaft 53. Arcuate slot 54S is approximately 3 mm deep and/or deeper if necessary to cause the inductive proximity sensor 58 to change state as the shaft rotates relative to the fixed proximity sensor. Arcuate slot 54S is approximately 10 mm wide. The proximity sensor 58 has a nominal range of 3 mm. One suitable inductive sensor is 1E5215 available from ifm efector, inc., 1100 Atwater Drive, Malvern, PA 19355 and it is a normally open, pnp transistor output, with a nominal 3 mm sensing range. The data sheet for 1ES215-00 EN-US is publicly available and incorporated herein by reference hereto. When the inductive proximity sensor 58 is in proximity with the arcuate slot 54S in the shaft 53, the switch is normally open meaning no voltage is being supplied to the output 63. See, FIG. 12.

Figure 12:
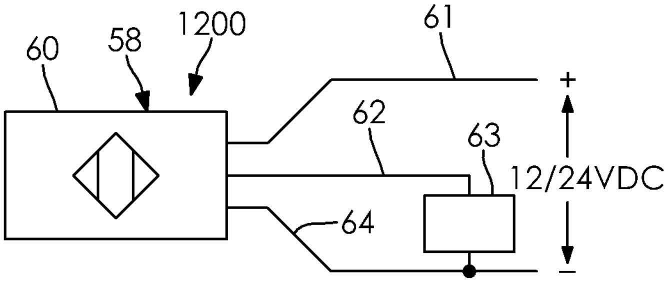
FIG. 12 is an electrical diagram of the inductive proximity sensor with normally open contacts.

FIG. 12 is an electrical diagram of the inductive proximity sensor 58 with normally open contacts. Referring to FIG. 12, the inductive proximity switch 58 consists of a sensor circuit 60 and a driver circuit 63. The inductive sensor circuit's purpose is used to detect the rotational position of the shaft which corresponds to the relative position of the tipper mechanism in relation to the collision zone. The shaft 53 of the rotary actuator 20K includes slot 54S and the inductive proximity sensor detects the slot and hence the position of the steel shaft 53. The sensor circuit 60 sends an output high signal to a transistor-based driver circuit 63 when steel shaft 53 is near to the sensor circuit 60. The transistor-based driver circuit 63 may use NPN or PNP transistors, but as previously stated the 1ES215 utilizes a pnp transistor.

When a signal is received from the sensor circuit 60 because the steel shaft 53 is less than 3 mm from the inductive proximity sensor 58 and more appropriately is 1 mm from the shaft, the transistor will be turned on and the output 62 will be on; this is the position of the steel shaft 53 and the cart tipper 12 that permits operation of the packer blade. When the slot 54S of the metallic shaft 53 is in proximity with the sensor circuit 60, the sensor output is off and the contacts of the proximity sensors are in their normally open state. The driver circuit 63 is adapted to drive (or complete the circuit) an external/secondary device (not shown) such as a control relay which operates a solenoid operated packer blade hydraulic interrupt valve removing hydraulic system fluid pressure from a packer blade control system when the cart tipper 12 is approaching the second up position or is in the second up position and the inductive proximity sensor 58 is aligned with the slot 54S and the sensor output is off and the contacts are in their normally open state. The solenoid operated packer blade interrupt valve is a preferably a solenoid operated, 2-way normally open, pilot operated poppet valve with free reverse flow energized and de-energized.

Other valve arrangements are contemplated. Other use of relays or a PLC (programmable logic controller) is contemplated. In other words, the PLC, in this example or embodiment, would be programmed to prohibit the operation of the packer blade if the cart tipper 12 is in the up position as detected by the inductive proximity sensor.

Figure 9A:
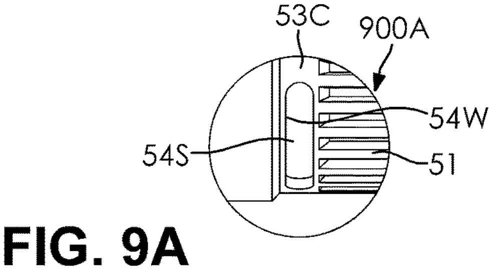
FIG. 9A is an enlarged view 900A of a portion of FIG. 9.

FIG. 9A is an enlarged view 900A of a portion of FIG. 9 illustrating the wall 54W of the slot 54S being 3 mm or greater in depth with respect to the cylindrical surface 54A of the steel shaft 53. Reference numeral 53C represents the chamfer or step down in diameter from the larger unnumbered diameter to the diameter of the shaft 53 where the slot 54S is located. Cylindrical surface 54A extends around the shaft 53. Slot 54S as viewed in FIG. 9A has an arcuate bottom which is unnumbered to keep the FIG. 9A clear.

Figure 10:
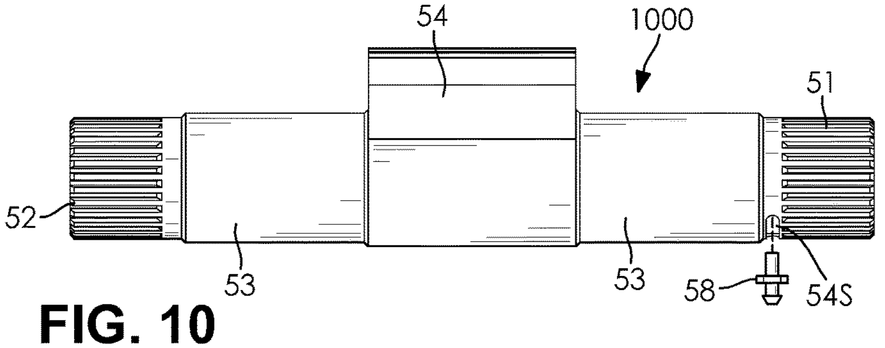
FIG. 10 is a view of the shaft of the rotary actuator, the arcuate slot in the shaft, and the inductive proximity sensor in alignment with the slot.
Figure 10A:
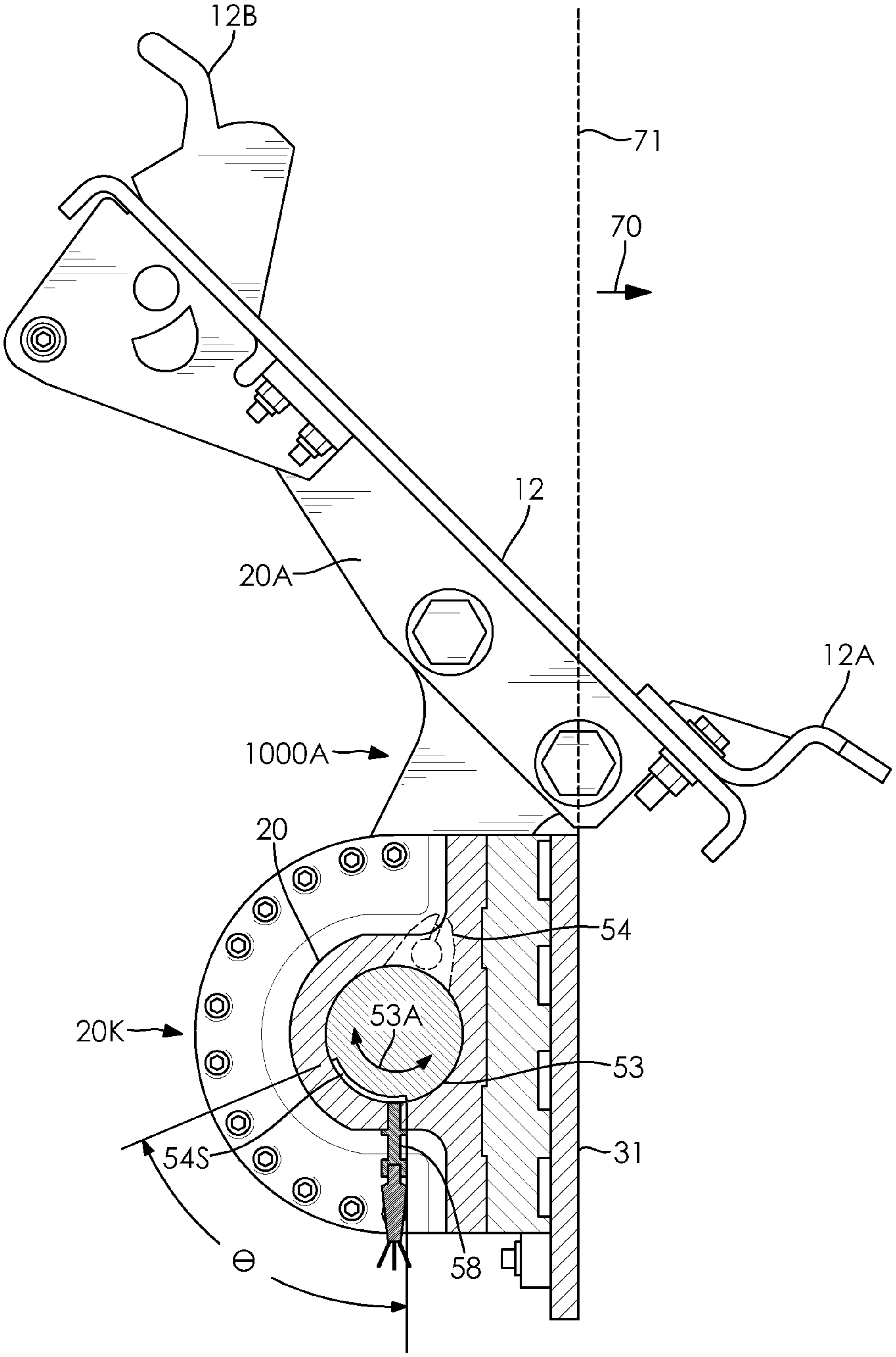
FIG. 10A is a side view of the cart tipper in the up position/dump position with the rotary actuator in cross-section illustrating the shaft of the rotary actuator, an arrow indicating possible bidirectional rotation of the shaft, the slot in the shaft of the rotary actuator, and the inductive proximity sensor mounted in the housing and aligned with the slot in the shaft.

FIG. 10 is a view 1000 of the steel shaft 53 of the rotary actuator 20K, the arcuate slot 54S in the steel shaft 53, and the inductive proximity sensor 58 positioned in space above the slot. FIG. 10 illustrates and teaches visually the position of the sensor 58 in regard to the slot 54S. FIG. 10A is a side view 1000A of the cart tipper 12 in the up position/dump position with the rotary actuator 20K in cross-section illustrating the steel shaft 53 of the rotary actuator 20K, an arrow 53A indicating possible bidirectional rotation of the steel shaft 53, the slot 54S in the steel shaft 53 of the rotary actuator 20K, and the inductive proximity sensor 58 mounted in the housing 20 and aligned with the slot 54S in the steel shaft 53. The arcuate slot 54S is about 68° as illustrated in FIG. 10A and as indicated by the Greek letter θ. Other angular ranges may be used, and they may be smaller or larger than 68° and may be in the range of 5-90°. The range will depend on a number of factors including the geometry of the cart tipper 12 and of the waste container which is secured to the cart tipper.

A different structure may be used wherein the steel shaft 53 includes a cam thereon and a cam follower (not shown) in combination with a switch(s) detecting the position(s) of the cam follower which can detect the position of the rotary shaft 53 which, in turn, said switch position(s) is/are input into an appropriate control system such as those described hereinbelow in connection with FIGS. 14, 14A, 14B and 15 for coordinated action and operation of the rotary cart tipper and the packer blade. The cam can also be used with a non-contact proximity sensor.

In yet another structure, the proximity sensor can be mounted outside the actuator by mounting a circular disc on the splined portion of the actuator shaft 53 outside the actuator wherein the circular disc has an arcuate void therein and the proximity sensor being an actuator mounted fixed sensor senses the arcuate void in the circular disc as the actuator shaft rotates. Many different types of switches may be used including the inductive proximity switch described herein. Additionally, or instead of the arcuate void, a rotary encoder may be used having voids spaced in a shaft-mounted disk in combination with a light source and a photo sensor to detect the rotary position of the shaft 53.

Still referring FIG. 10A, the gap shown between the inductive proximity sensor 58 and the arcuate slot 54S is approximately 4 mm. The slot 54S is nominally 3 mm deep in the cylindrical shaft 53. The inductive proximity sensor 58 is threaded into the housing 20 and it utilizes metric threads designated as M8×1 wherein 8 is the nominal diameter in mm and 1 is the nominal pitch diameter. The sensor 58 is mounted in such a way to achieve desired gaps between the head of the sensor and the shaft surface 54A and between the head of the sensor and the bottom of slot 54S.

Figure 10B:
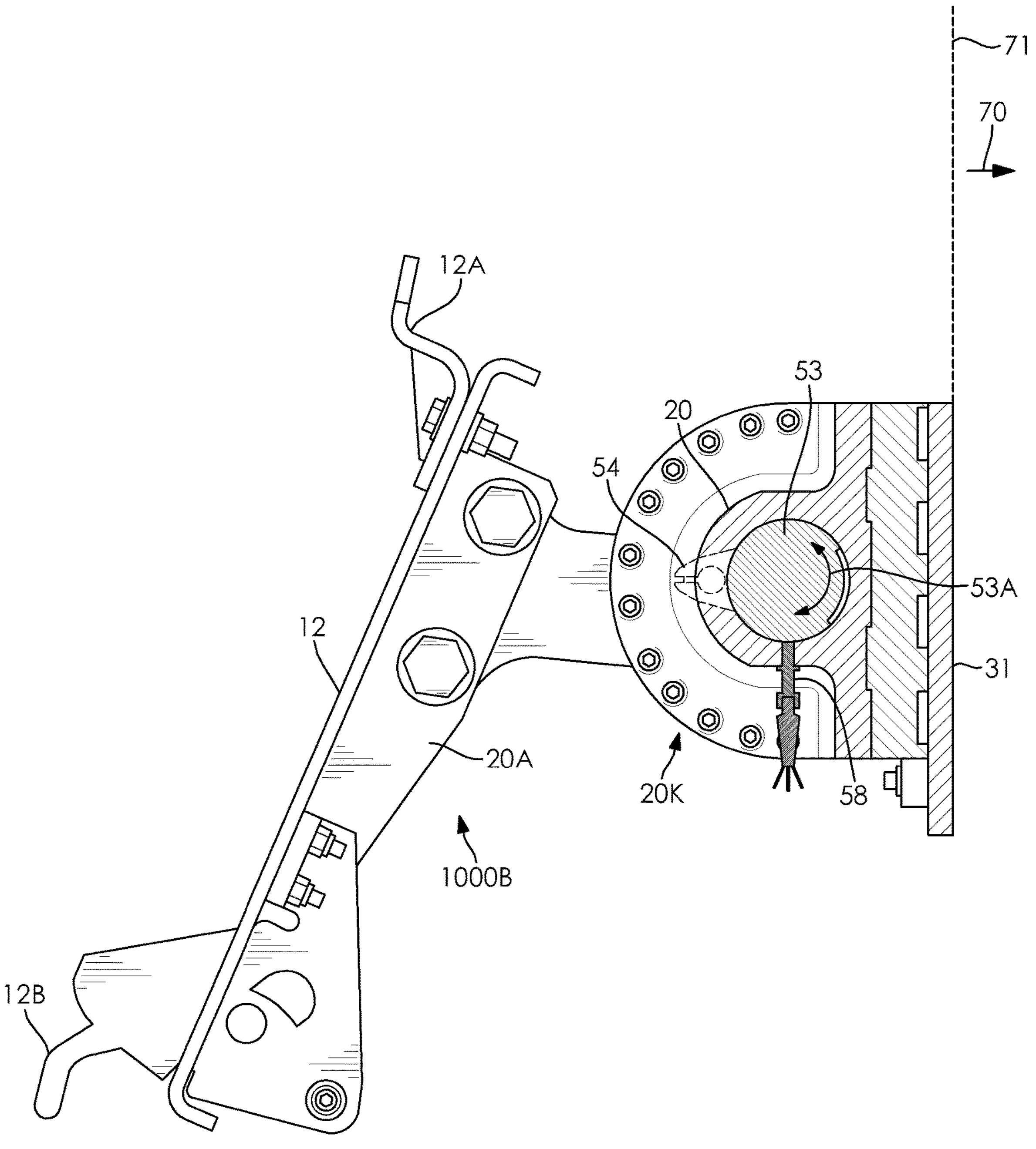
FIG. 10B is a side view of the cart tipper in mid-rotation nearing the position to receive a container with the rotary actuator in cross-section illustrating the shaft of the rotary actuator, an arrow indicating possible bidirectional rotation of the shaft, the slot in the shaft of the rotary actuator, and the inductive proximity sensor mounted in the housing and not aligned with or in proximity with the slot in the shaft.

Referring to FIG. 10B, the gap between the inductive proximity sensor 58 and the cylindrical steel shaft surface 53 is 1 mm which results in the normally open contacts of the inductive proximity sensor 58 closing thus yielding an output voltage on line 62 supplied to the drive circuit/load 53. As stated previously, the drive circuit operates or completes an external/secondary device which may be a control relay and/or other device which permits or prohibits operation of the packer blade. Also, see FIGS. 14 and 14A which illustrate the proximity sensors 1404, 1434 with normally open contacts in series with control relays 1408, 1428.

FIG. 10B is a side view 1000B of the cart tipper 12 in mid-rotation nearing the position to receive a container with the rotary actuator 20K partially in cross-section illustrating the steel shaft 53 of the rotary actuator 20K, an arrow 53A indicating possible bidirectional rotation of the steel shaft 53, the slot 54S in the steel shaft of the rotary actuator 20K, and the inductive proximity sensor 58 mounted in the housing 20 of the actuator and not aligned with and not near the slot 54S in the steel shaft 53.

Figure 11A:
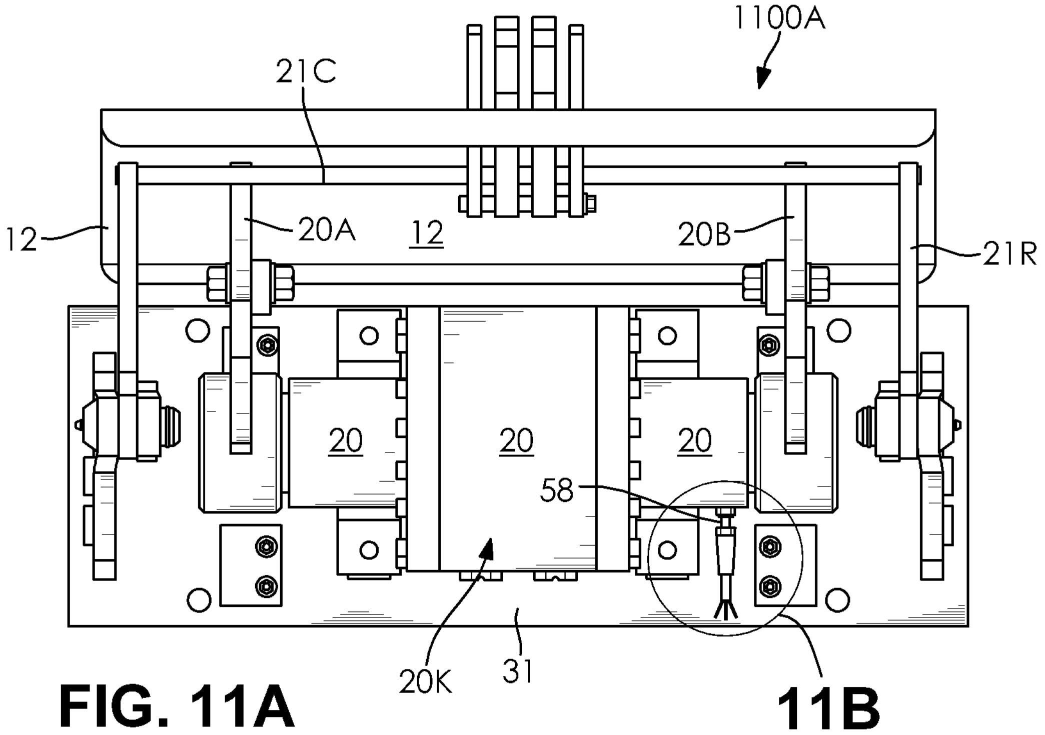
FIG. 11A is a front view of the cart-tipper in the up or dumping position.

FIG. 11A is a front view 1100A of the cart-tipper 12 in the up or dumping position illustrating the inductive sensor 58 with wires extending therefrom.

Figure 11B:
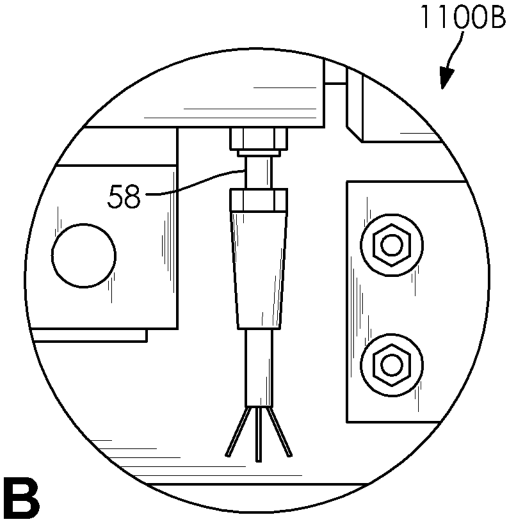
FIG. 11B is an enlargement of a portion of FIG. 11A

FIG. 11B is an enlargement 1100B of a portion of FIG. 11A illustrating the inductive sensor threaded into the housing 20.

In addition to the use of the inductive proximity sensors, other proximity sensors could be placed in proximity to the steel shaft 53 with a different structural arrangement. Those other proximity sensors include: Magnetic, photo electric, mechanical plunger switch, capacitive sensor, ultrasonic, encoders, lasers, RVDT, roller switches, inclinometers, cam and cam followers, rotary encoders, and so on as previously described herein.

Figure 13:
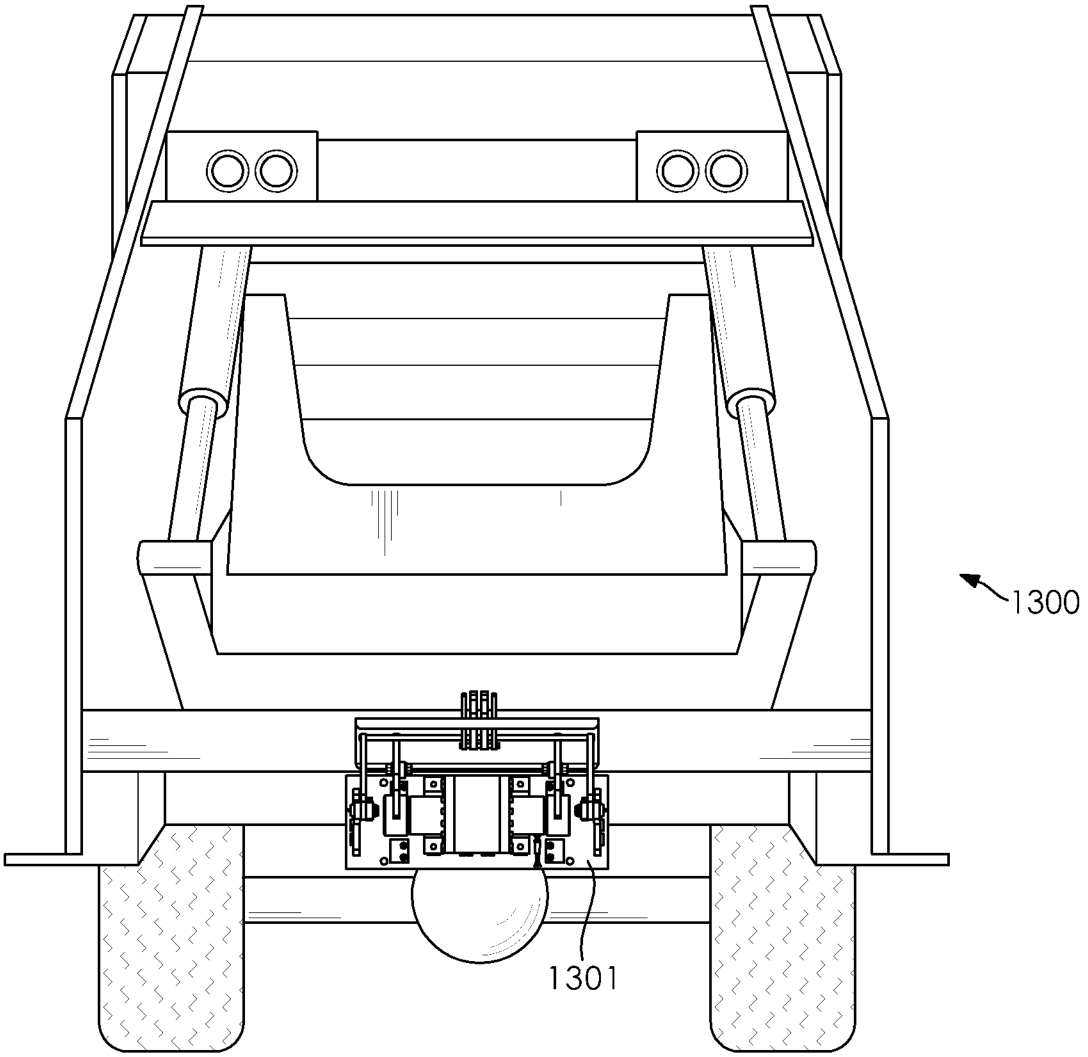
FIG. 13 is a schematic view of the cart-tipper in the up or dumping position mounted on a waste truck showing the cart tipper moving toward the up position.

FIG. 13 is a schematic view 1300 of the cart-tipper 1301 in the up or dumping position mounted on a waste truck showing the cart tipper 1301 in the up or dumping position.

Figure 13A:
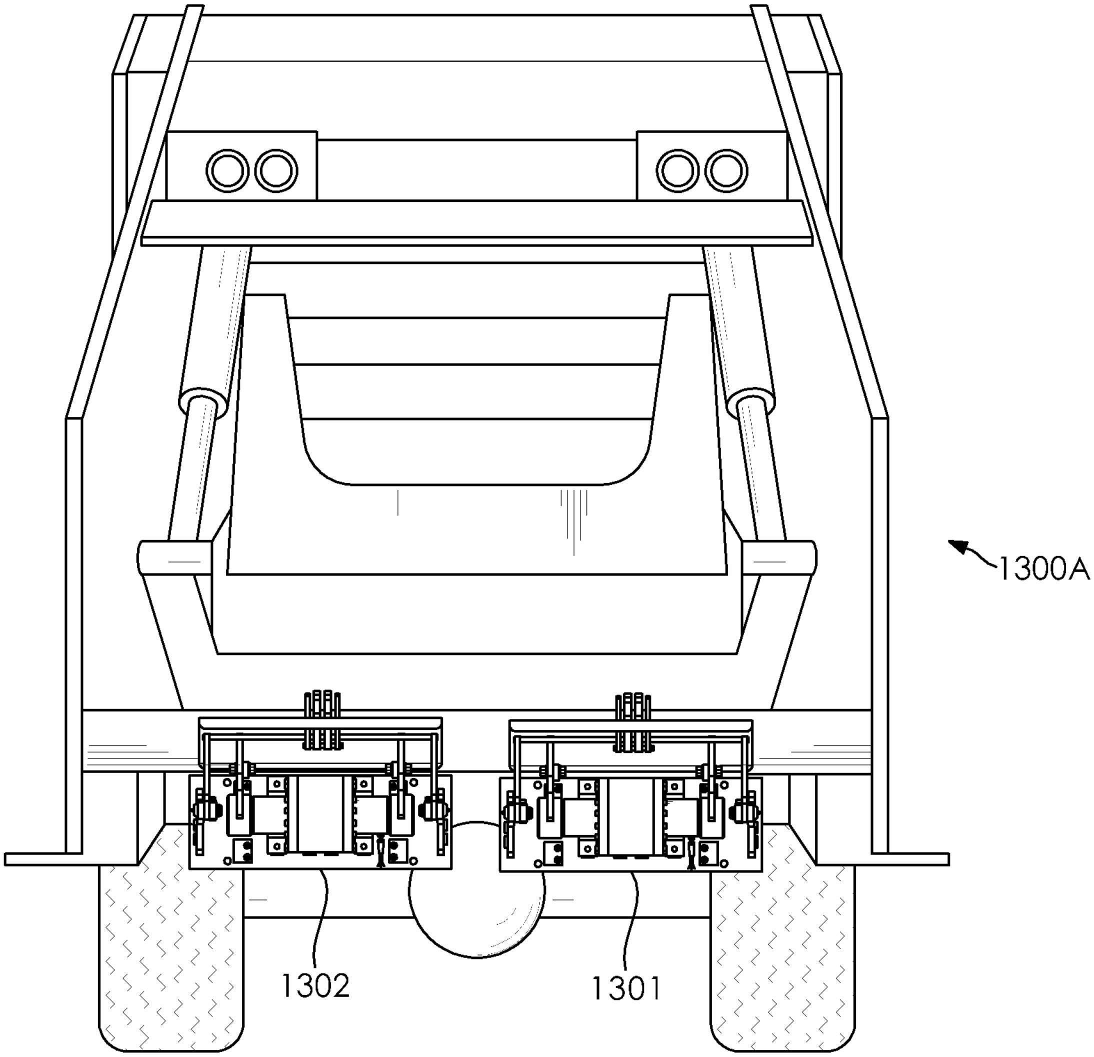
FIG. 13A is a schematic view with two cart-tippers disposed in the up or dumping position mounted on a waste truck showing the cart tipper moving toward the up position.

FIG. 13A is a schematic view 1300A with two cart-tippers 1301, 1302 disposed in the up or dumping position mounted on a waste truck showing the cart tipper in the up or dumping position.

Figure 14:
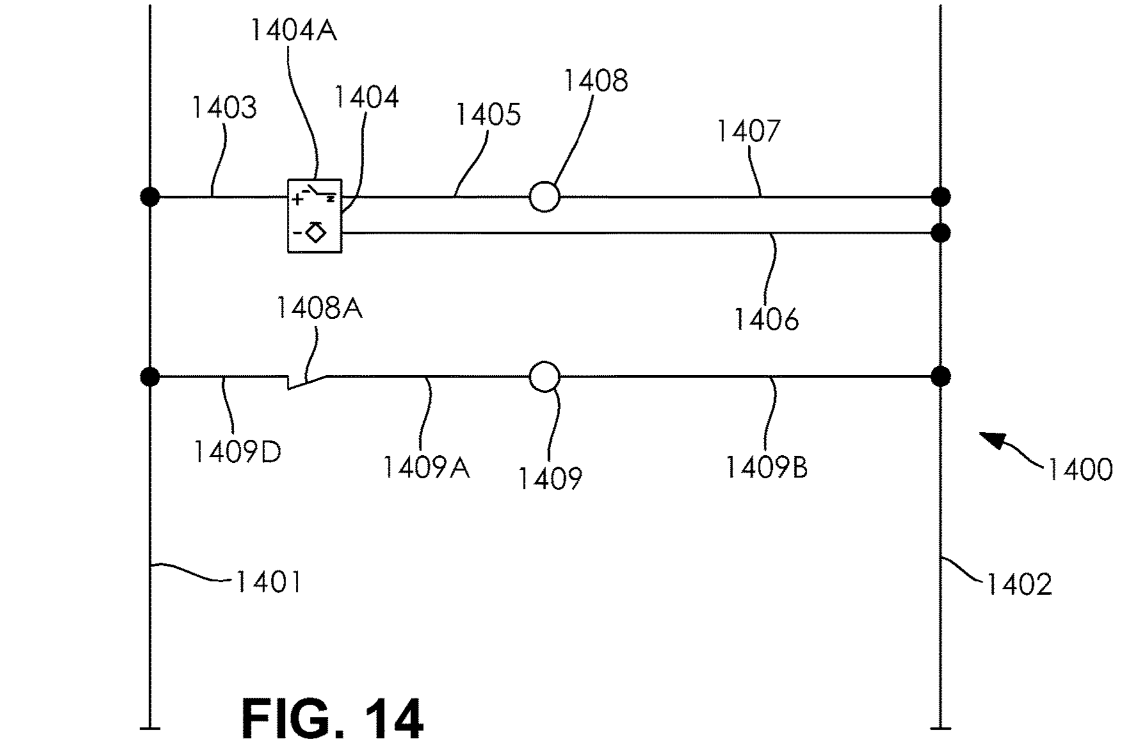
FIG. 14 schematically illustrates the controller circuit for the single cart-tipper in FIG. 13.

FIG. 14 schematically illustrates 1400 the controller circuit for the single cart-tipper in FIG. 13. FIG. 14 is a ladder diagram illustrating the inductive proximity sensor 1404 and contacts 1404A. Reference numeral 1401 is the 12 VDC power supply source supplying power to the inductive proximity sensor 1404 via line 1403. Inductive proximity sensor 1404 has normally open contacts 1404A. Reference numeral 1402 is at zero volts DC, 0 VDC. Reference numeral 1405 is the power supply line to control relay 1408 when switch contacts 1404A are closed. Reference numeral 1407 is 0 (zero) VDC line connection to control relay 1408. Reference numeral 1406 is the 0 (zero) VDC line connection to 0 (zero) VDC rail 1402 for the inductive proximity sensor 1404.

Control relay 1408 has normally closed relay contacts 1408A interconnected by control line 1409A with solenoid operated, 2-way normally open, pilot operated poppet valve diverter valve 1409. Reference numeral 1409A is a line from switch contacts 1408A to solenoid operated diverter valve 1409 (diverter input). Similarly, reference number 1409B is a line from solenoid operated diverter valve 1409 to the 0 (zero) VDC rail 1402.

Figure 14A:
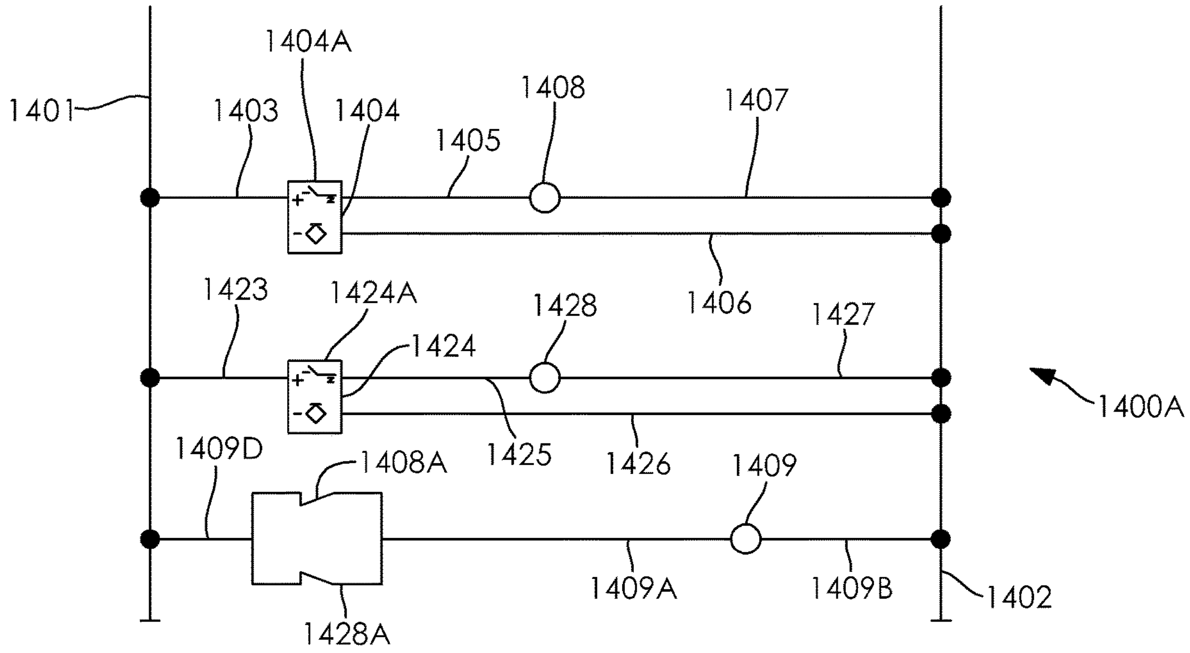
FIG. 14A schematically illustrates the controller circuit for two cart-tippers in FIG. 13A.

FIG. 14A schematically illustrates 1400A the controller circuit for the two rotary cart-tippers 1301, 1302 illustrated in FIG. 13A. FIG. 14A is a ladder diagram 1400A for the controller circuit wherein two cart tippers are used. Control relay 1408 has normally closed contacts 1408A as illustrated in FIG. 14A. Similarly control relay 1428 has normally closed contacts 1428A. When inductive proximity sensors 1404, 1424 are in proximity to their respective slots 54S it means that the two rotary cart tippers are in their up positions and in the collision zone described above. Contacts 1404A, 1424A of the inductive proximity sensors 1404, 1428 are normally open when the sensors do not detect metal in proximity to the sensors (for instance, when they are located in proximity to the slots). When the contacts 1404A, 1424B of the inductive proximity sensors 1404, 1428 are open, then control relays 1408, 1428 are not energized and their contacts 1408A, 1428A are in their normally closed state meaning that solenoid operated, 2-way normally open, pilot operated poppet valve 1409 is energized. Valve 1409 as illustrated in FIG. 14A is energized and has free reverse flow meaning that the packer blade valves cannot be supplied with pressure, further meaning that the packer blade flow and pressure has been interrupted and cannot move. Line 1409D interconnects the normally closed contacts 1428A of control relay 1428 which are in parallel with normally closed contacts 1408A of control relay 1408 with the 12 VDC rail. Line 1409A interconnects parallel contacts 1408A, 1428A with the valve 1409. Line 1409B interconnects the 0 VDC rail with the valve 1409.

If one of the contacts 1404A, 1424A of the proximity switches 1404, 1424 of one of the cart tippers close (meaning one of the cart tippers is down out of the collision zone), the packer blade still cannot move because the other cart tipper remains in the collision zone as set forth in FIG. 14A.

Figure 15:
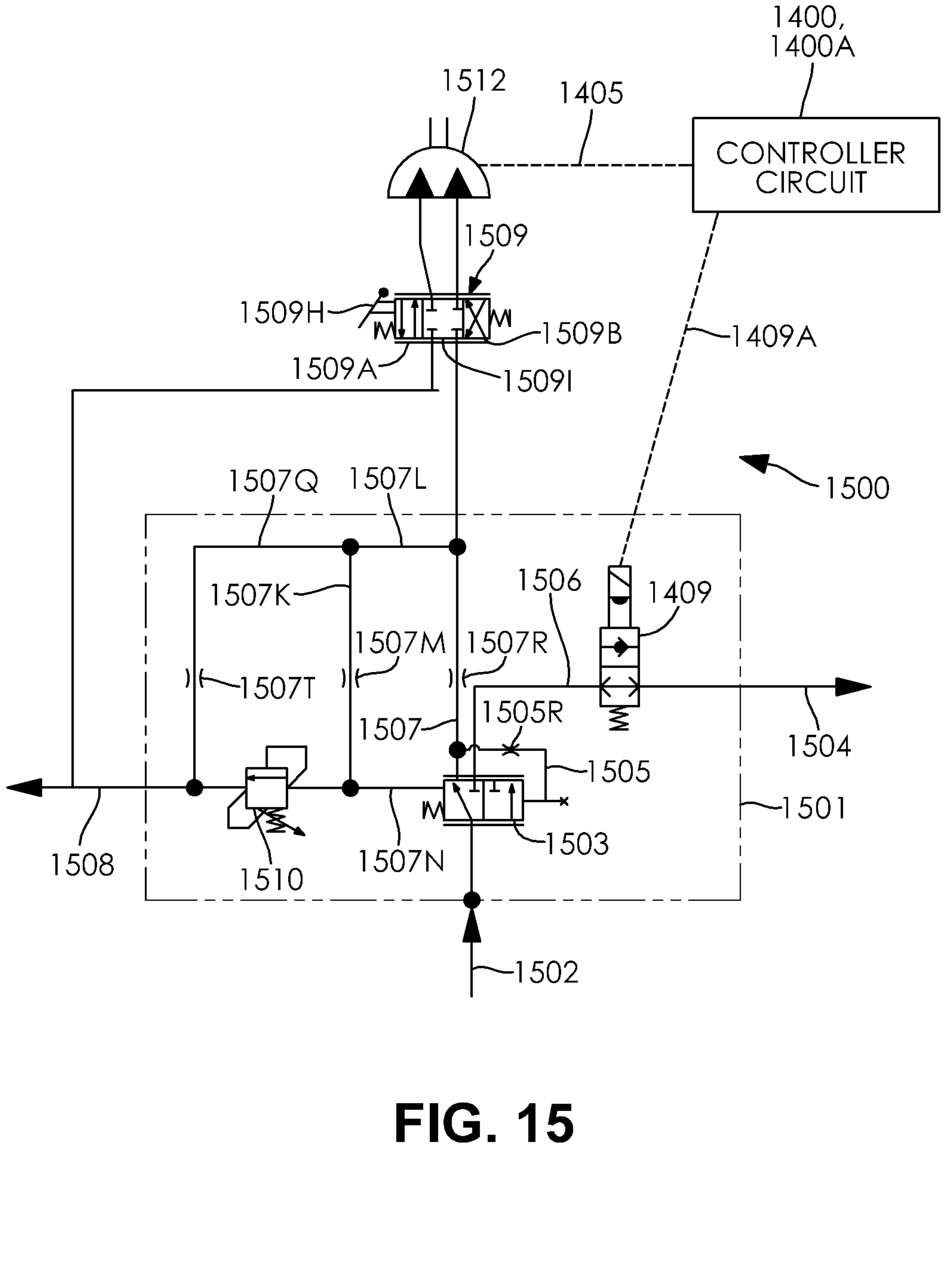
FIG. 15 schematically illustrates the controller circuit and the manifold valve assembly illustrated within the dashed lines for the bidirectional hydraulic control of the rotary cart tipper.

If both contacts 1404A, 1424A close, then both relays 1408, 1428 energize and open both contacts 1408A, 1428A and solenoid valve 1409 is deenergized and, as shown in FIG. 15, hydraulic flow and pressure are communicable to the packer blade controls.

Still referring to FIG. 14A, the ladder diagram illustrates the same information in FIG. 14 in part for the cart tipper 1301 illustrated in FIG. 13. For instance, relay 1408 and all of the interconnections and powering of the inductive proximity sensor 1404 are the same as described in connection with FIG. 14. See FIG. 13A and the right most cart tipper. The second rotary cart tipper is controlled by the ladder diagram on FIG. 14A in conjunction with the hydraulic systems of FIG. 15. Power is supplied to the inductive proximity sensor on line 1423. Line 1423 interconnects with the 12 VDC bus bar 1401. Inductive proximity sensor 1424 is also connected to the 0 VDC bus bar 1402. Line 1425 interconnects the output terminal of inductive proximity sensor 1424A with the control relay 1428 for the second cart tipper. Line 1426 electrically interconnects inductive proximity sensor 1424 to the 0 VDC rail 1402. Control relay 1428 has normally closed contacts 1428A which in parallel with normally closed contacts 1408A of control relay 1408 enable solenoid operated, 2-way normally open, pilot operated poppet valve 1409 to be energized which means that flow and pressure to the packer blade valves is prohibited. See FIG. 15.

When both of the cart tippers 1391, 1302 are in the lower positions and the proximity sensors 1404, 1424 are not in proximity to their respective slots 54S but in proximity to the cylindrical surface of the metal shaft 53 of the rotary cart tipper, then normally closed contacts of control relays 1408, 1428 open and enable solenoid operated, 2-way normally open, pilot operated poppet valve 1409 to be deenergized (as shown in FIG. 15) which means that flow and pressure to the packer blade valves is allowed enabling operation of the packer blade. See FIG. 15 which illustrates valve 1409 in its deenergized state allowing pressure and flow along line 1504 leading to the packer blade controls. If either cart tipper 1301, 1302 is in the up position and the inductive proximity sensor of that cart tipper is near its respective slot 54S in the metallic shaft 53, then solenoid operated valve 1409 is energized and flow and pressure to the packer blade is blocked.

Figure 14B:
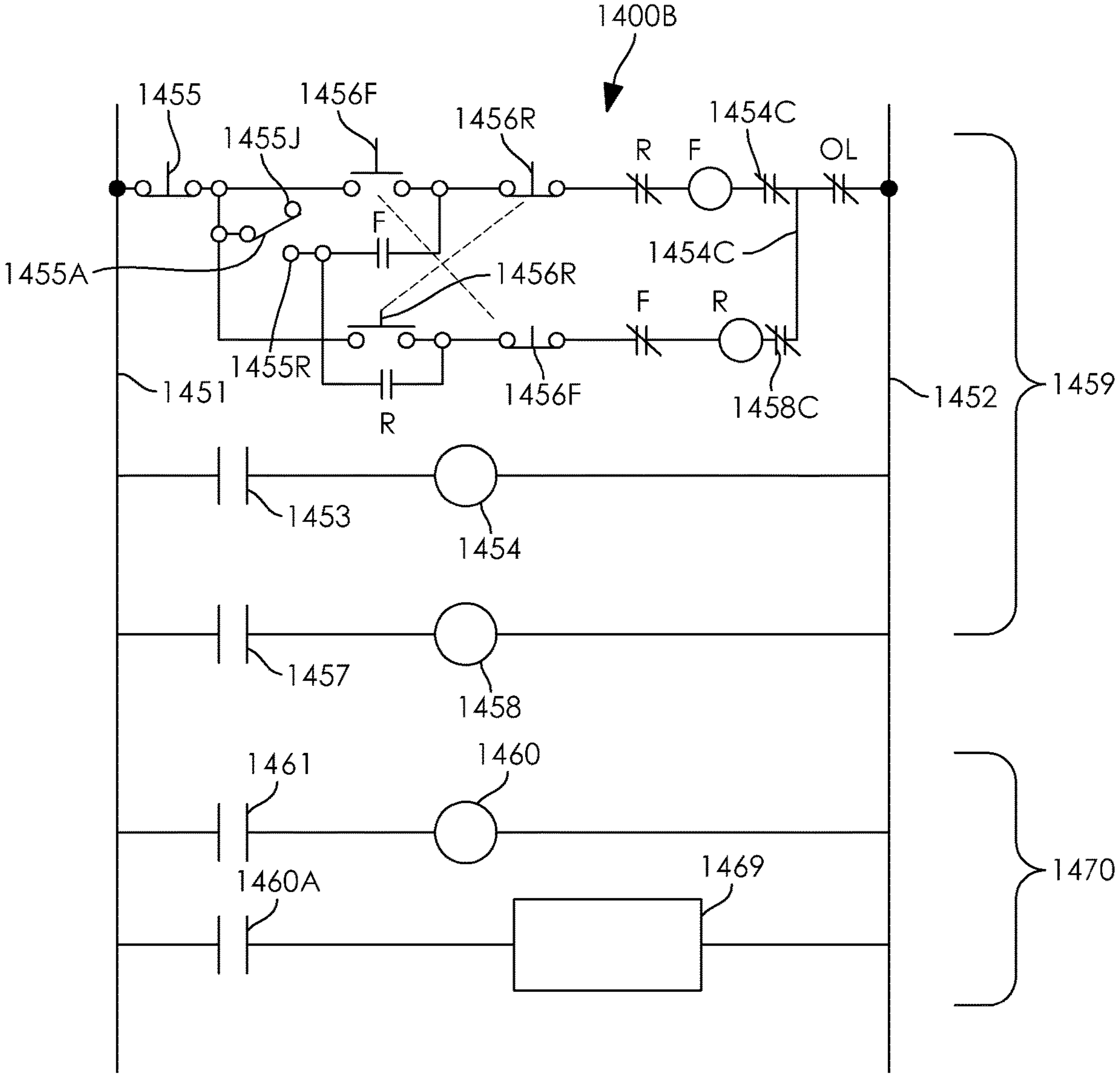
FIG. 14B schematically illustrates a bidirectional jog controller circuit for an electrically powered and operated cart tipper together with an electrically powered and operated packer blade and a proximity sensor operated electrical interrupt.

FIG. 14B schematically illustrates a jog controller circuit 1400B for an electrically operated cart tipper together with an electrically operated packer blade with inductive proximity sensor contacts 1461 operated as an electrical interrupt. FIG. 14B is a ladder diagram of a forward and reverse jogging circuit having an interlock between the forward push buttons 1456F and the reverse push buttons 1456R so that the forward F and reverse R motor starters cannot be energized at the same time. If the forward push button 1456F is pressed the upper contacts are made but the lower contacts of 1456F are broken. If the reverse push button 1456R is pressed the lower contacts are made and the upper contacts 1456R are broken. The dashed lines indicate the interlocks of the push buttons 1456F, 1456R. Reference numerals 1451, 1452 illustrate power supply lines.

If selector switch 1455A is in the jog mode, for instance, connected/switched to terminal 1455J, as illustrated in FIG. 14B, the selector switch is in the open position meaning that the seal in contacts for the motor starters F, R cannot not be completed. From the ladder diagram illustrated in FIG. 14B it can be viewed the jog selector 1455A (shown in the jog mode) cannot feed either of the seal-in circuits (contacts F, R shown open in FIG. 14B) which prevents them from sealing in the forward 1456F or reverse 1456R push buttons are pressed. When coil F is energized in the forward circuit, contacts F in the reverse circuit open. Similarly, when coil R is energized in the reverse circuit, contacts R in the forward circuit open. In this way it is not possible to run the motor in the forward and reverse direction at the same time.

When the selector switch is in the jog position shown in FIG. 14B, the cart tipper motor associated with the controls 1459 (not shown) will operate in the forward direction as long as the forward push button 1456F is pressed and until forward (upper) limit switch 1453 is closed as the rotary cart tipper is in its fully up position. Forward (upper) limit switch 1453 is a mechanical switch which closes when the rotary cart tipper is in the fully up position. When limit switch 1453 closes, control relay 1454 energizes and contacts 1454C open deenergizing the forward or upper movement of the cart tipper motor and cart tipper devices. As soon as the forward push button 1456F is released, the motor starter F will become de-energized and the rotary cart tipper motor (not shown) will stop. This selector switch 1455A also allows the motor to be jogged from one direction directly to the other direction without having to use the stop button 1455. Stop button 1455 removes power from the rotary cart tipper.

The cart tipper motor (not shown) will operate in the reverse direction as long as the reverse push button 1456R is pressed and until rearward (lower) limit switch 1457 is closed as the rotary cart tipper is in its fully down position. Mechanical limit switch 1457 energizes control relay 1458 which opens the normally closed contacts 1458C in the reverse circuit. In this way the reverse circuit is controlled.

The cart tipper motor (not shown) is protected by overloads, O.L., that are connected in series with the forward and reverse motor starter coils, F, R. If one of the overloads trips, the overload contacts in the control circuit will open and neither coil F, R can be energized without first resetting it.

If selector switch 1455A is in the run mode, for instance, connected/switched to terminal 1455R, as illustrated in FIG. 14B, the selector switch is in the closed position meaning that the seal in contacts for the motor starters F, R can be completed. For instance, if the forward push button 1456F is pressed, motor starter coil F will energize and seal in contacts F will close and interlock contacts F will open preventing energization of motor starter coil R. Reference numeral 1459 signifies the controls for the rotary cart tipper motor.

Still referring to FIG. 14B, inductive proximity sensor (not shown) has normally open contacts 1461 as described in connection with contacts 1404A, 1424A in FIGS. 14 and 14A. When the inductive proximity sensor contacts 1461 close when the inductive proximity sensor is near the metallic shaft 53 of the rotary cart tipper, control relay 1460 energizes which results in the control relay contacts 1460A closing and power being supplied to the packer blade control circuit 1469 from power supply lines 1451, 1452. In other words, the packer blade control circuit 1469 is energized and the packer blade is movable between its respective positions as described hereinabove when the inductive proximity sensor is near the metallic shaft 53. The inductive proximity sensor itself is not shown in FIG. 14B but it operates just as the proximity sensors 1404 and 1424 in FIGS. 14, 14A operate. Reference numeral 1470 are brackets which indicate the controls as described for the packer blade motor.

FIG. 15 schematically illustrates 1500 the controller circuit 1400 and the manifold valve unit assembly illustrated within the dashed lines 1501.

FIG. 15 schematically illustrates a view 1500 of the controller circuit and the manifold/valve unit assembly 1501 illustrated within the dashed lines. The dashed line box 1501 signifies a complete manifold/valve unit assembly 1501. It includes all the components shown within the dashed line box 1501. "P" means Pressure line (coming into the manifold) 1502. Tank line (leaving the manifold/valve unit) 1508 is illustrated in FIG. 15. The manifold/valve unit 1501 includes a differential area relief valve 1510, a steering priority flow control valve 1503 with static load sense, and a solenoid operated, 2-way normally open, pilot operated poppet valve 1409 with free reverse flow energized and de-energized. As shown in FIG. 15, solenoid valve 1409 is illustrated in its deenergized state. Reference numeral 1504 is the extra flow line from the priority flow control valve 1503 feeding the packer valves. "Extra flow" is a term used in describing flow other than priority flow from priority flow control valves such as valve 1503.

The packer blade cylinders and any other auxiliary equipment are fed by line 1504. The solenoid operated, 2-way normally open, pilot operated poppet valve 1409 (diverter valve), is positioned and mounted in lines 1504, 1506. Line 1506 is from the steering priority flow control valve 1503 to the solenoid operated, 2-way normally open, pilot operated poppet valve 1409.

Still referring to FIG. 15, line 1507 from the steering priority flow control valve 1503 feeds the hand-operated control valve 1509 which controls flow to the cart tipper 1512. Hand-operated control valve 1509 includes: a first portion 1509A enabling the supply of pressure to the cart tipper to rotate the cart tipper in the upward direction; a second portion 1509B of hand valve 1509 enabling the supply of pressure to the cart tipper to rotate the cart tipper in the downward direction; and, an intermediate portion 1509I which does not permit flow of hydraulic fluid to the cart tipper 1512. Handle 1509H enables hand operation of control valve 1509 and controls the hydraulically powered cart tipper.

Still referring to FIG. 15, line 1507 with restriction 1507R leads to line 1507L which is fed back using lines 1507K, 1507N to the sensing port (unnumbered) on the priority valve 1503. Line 1507K includes a restriction 1507M therein. Line 1507Q extends from its junction with line 1507L to a point downstream of the differential area relief valve 1510 where it is also routed to the tank, T via hydraulic line 1508. Tank, T, is a reservoir of hydraulic fluid (not shown) used in the control/actuation system of the waste truck including in the operation of the cart tipper 1301, 1302 and the packer blade fed by hydraulic line 1504. Line 1507Q includes a restriction 1507T therein.

The half-circle symbol with the arrows is the hydraulic symbol for a rotary actuator 1512. Relief valve 1510 is a differential area relief valve and is present within the valve unit 1501 to allow the pressure that builds up when the tipper 1512 is not running to relieve into the tank line 1508.

Referring to FIG. 15, electrically controlled solenoid operated, 2-way normally open, pilot operated valve 1409 with free reverse flow in its energized and deenergized condition is illustrated in FIG. 15. Valve 1409 is shown in the deenergized state in FIG. 15. Reference numeral 1405 is the control line from the inductive proximity sensor 1404 which energizes the control relay 1408 when normally open sensor contacts 1404A close indicating that the sensor is in proximity to the cylindrical metal shaft 53 and is not near (in proximity to) slot 54S.

When proximity switch contacts 1404A, 1424A are open the valve 1409 is energized and hydraulic flow from line 1506 to line 1504 is blocked preventing operation of the packer blade. The upper compartment/section/portion of the valve 1409 with the check valve is aligned with lines 1506, 1504 as illustrated in FIG. 15 and blocks flow and pressure from the controls of packer blade.

When proximity switch contacts 1404A, 1424A are closed, valve 1409 is deenergized and flow from line 1506 supplies hydraulic line 1504 which permits operation of the packer blade because the cart tippers 1301, 1302 are not in the collision zone.

Still referring to FIG. 15, reference numeral 1409A indicates electrical communication of power to solenoid operated, 2-way normally open, pilot operated valve 1409 which blocks the flow or extra flow of hydraulic fluid to the packer valves connection with hydraulic line 1504. FIGS. 14, 14A and 15 are read together to understand operation of the system.

LIST OF REFERENCE NUMERALS

- 100A—schematic electrical diagram FIG. 1A of the proximity sensor 8A in the non-actuated state with the contacts of the proximity sensor open, the solenoid coil 14, and the solenoid operated valve 15 permitting flow between a pressure source 17 and the pressure load 18.
- 100B—schematic electrical diagram FIG. 1B of the proximity sensor in the actuated state with the contacts of the proximity sensor closed, the solenoid coil 14 energized and the solenoid operated valve 15 not permitting flow between the pressure source 17 and the pressure load 18.
- 100C—schematic electrical diagram FIG. 1C of the non-actuated proximity sensor, the solenoid coil 14, and the solenoid operated valve 15 permitting flow between the pressure source 17 and the pressure load 18.
- 100D—schematic electrical diagram FIG. 1D of the actuated proximity sensor, the solenoid coil 14 and the solenoid operated valve 15 preventing flow from the pressure source 17 to the pressure load 18.
- 100E—is a schematic electrical diagram of a rotary potentiometer driving the transistor when the rotary potentiometer senses the cart tipper in the up position or within a range of motion near the fully up position of the cart tipper.
- 200—view of the cart-tipper 12 in the down position, FIG. 2, for receiving a container.

300—view of the cart-tipper 12 in the up or dumping position, FIG. 3, position for dumping the container.
300A—enlarged view of FIG. 3 illustrating the proximity sensor, FIG. 3A.
400—view of the cart-tipper mounted on a waste truck showing the cart-tipper in the up position, FIG. 4.
400A—enlarged view of a portion of FIG. 4 illustrating the proximity sensor.
500—side view of the cart tipper 12, FIG. 5, approaching the uppermost rotational position
500A—enlarged side view of the cart-tipper 12 of FIG. 5 illustrating the proximity sensor, FIG. 5A.
500B—side view of the cart tipper 12, FIG. 5B, in the uppermost rotational position.
600—side view of the cart tipper 12, FIG. 6 near the mid-stroke position.
700—prior art view 700 of the cart-tipper 12 mounted on a waste truck 2 showing the cart tipper 12 moving toward the up position with the packer blade 3 not retracted such that both the cart tipper 12 and the packer blade 3 are in the collision zone.
800—front view of shaft 53 and vane 54 and a portion of the rotary actuator which moves the tipper between first and second positions.
900—exploded view of FIG. 8 illustrating the rotary housing 20 separated from the rotary shaft 53 which includes a slot 54S therein.
900A—enlarged portion of FIG. 9.
1000—another exploded view of FIG. 8 illustrating the shaft 53 with the slot 54S.
1000A—Sectional side view of the cart tipper 12 in the dumping position with the inductive proximity sensor 58 aligned with the slot 54S in the shaft 53, section view is cut at mid-plane of slot 54S.
1000B—side view of the cart tipper 12 in the down position in the vicinity of early lifting of a container (not shown) with the inductive proximity sensor 58 not aligned with the slot 54S in the shaft 53.
1100A—view of the cart-tipper 12 in the up or dumping position FIG. 11A position for dumping the container.
1100B—enlarged view of a portion of FIG. 11A illustrating the inductive proximity sensor.
1200—electrical diagram of the inductive proximity sensor.
1300—view of FIG. 13 wherein the cart-tipper 12 in the up or dumping position mounted on a waste truck 2 showing the cart tipper 12 moving toward the up position.
1300A—view of FIG. 13A similar to view 1300 with two cart-tippers 12 disposed in the up or dumping position mounted on a waste truck 2 showing the cart tipper 12 moving toward the up position.
1400—view of FIG. 14 illustrating the controller circuit of FIG. 14 for the single cart-tipper in FIG. 13.
1400A—view of FIG. 14A illustrating the controller circuit of FIG. 14A for the cart-tippers in FIG. 13A.
1400B—view of FIG. 14B schematically illustrating a jog controller circuit for an electrically operated cart tipper together with an electrically operated packer blade with a proximity sensor operated electrical interrupt.
1500—schematic view of FIG. 15 of the controller circuit 1400 and the manifold valve assembly 1501 illustrated within the dashed lines.
2—waste truck
3—packer blade
6—hand control valve for packer blade 3
7—hand control valve for cart tipper 12
8S—proximity sensor, potentiometer, hall effect, inductive, capacitive, ultrasonic
8A—proximity sensor contacts open
8B—proximity sensor contacts closed
8C—transistor
9—collector
10—base
11—emitter
12—cart tipper
12A—upper support of the cart tipper for the trash container which hooks under the lifting lip of the container
12B—gripper of the cart tipper for trash container which clasps the cylindrical bar of the container
13—input voltage to the solenoid coil 14
14—solenoid coil which moves the packer blade hydraulic interrupt hydraulic valve between a first position and a second position.
15—packer blade hydraulic interrupt hydraulic valve, a 2-port/2-position, solenoid operated, spring return valve 16.
16—spring return
17—hydraulic pressure source
18—hydraulic pressure load
20—rotary actuator housing, the center piece is called the body, and the two end pieces are called heads;
20K—rotary actuator which moves the tipper between first and second positions
20A—drive arm driven by the rotary actuator 20 for the cart tipper 12
20B—drive arm driven by the rotary actuator 20 for the cart tipper 12
21C—central arm which actuates the gripper 12B which grips a bar (not shown) on the container (not shown)
21L—left side guide and support arm
21R—right side guide and support arm
22—rotary potentiometer
23—voltage input to the rotary potentiometer
24—wiper on the rotary potentiometer
25—potentiometer resistor
30—rear sill plate of refuse/garbage truck
31—flat plate affixed to the rear plate which supports the cart tipper 12, which is affixed to the rear plate 30 of the refuse/garbage vehicle
40—space in truck for refuse/garbage when the packer blade is pulled back
41—arrow pointing to the space between the proximity sensor 8S and the guide arm 21R
51—right end of rotary shaft 53 which includes an unnumbered spline
52—left end of rotary shaft 53 which includes an unnumbered spline
53—rotary shaft
53A—arrow representing rotation of the shaft 53 in the clockwise direction which positions the cart tipper 12 in the dumping position and in the counter-clockwise direction which positions the cart tipper 12 in the down position
53C—chamfer on the steel shaft 53
54—rotary vane
54A—cylindrical surface into which slot 54S is cut
54S—arcuate slot in the periphery of the rotary shaft for determining shaft position
54W—wall of the slot 54S being 3 mm or greater in depth with respect to the cylindrical surface 54A of steel shaft 53

58—inductive sensor mounted in rotary actuator housing 20 (which senses the tipper between first and second positions)

60—sensor symbol

61—positive voltage input

62—positive voltage input to drive circuit 63

63—drive circuit to operate solenoid through external/secondary device, relay, PLC etc.

64—negative terminal, common or ground voltage

70—arrow indicating collision zone

71—imaginary plane defining start of collision zone

1301—single rotary cart tipper mounted on a waste truck

1302—a second rotary cart tippers mounted on a waste truck

1401—12 VDC rail

1402—0 VDC rail

1403—power supply line to inductive proximity switch 1404

1404—inductive proximity switch

1404A—contacts of the inductive proximity switch 1404

1405—power supply line to relay 1408 when switch contacts 1404A are closed

1406—0 (zero) VDC line connection to 0 (zero) VDC rail 1402

1407—0 (zero) VDC line connection to relay 1408

1408—relay

1408A—relay contacts

1409—a solenoid operated, 2-way normally open, pilot operated poppet valve diverter valve

1409A—line from switch contacts 1408A to solenoid operated diverter valve 1409 (diverter input)

1409B—line from solenoid operated diverter valve 1409 to 0 (zero) VDC rail 1402

1409D—line from 12 VDC rail 1401 to switch contacts 1408A, 1409A

1423—power supply line to inductive proximity switch 1424

1424—inductive proximity switch

1424A—contacts of the inductive proximity switch 1424

1425—power supply line to relay 1428 when switch contacts 1424A are closed

1426—line connection to 0 (zero) VDC to rail 1402

1427—0 (zero) VDC line connection to relay 1428

1428—relay

1428A—relay contacts

1451—line 1

1452—line 2

1453—limit switch contacts which sense upper limit of the cart tipper and stop the rotary cart tipper motor

1454—control relay

1454C—control relay 1454 normally closed contacts

1455—stop

1455A—JOG-RUN selector/switch

1455J—jog control position of selector

1455R—run control position of selector

1456F—forward direction pushbutton for upward cart tipper rotation

1456R—rearward direction pushbutton for downward cart tipper rotation

1457—limit switch contacts which sense lower limit of the cart tipper and stop the rotary cart tipper motor

1458—control relay energized when limit switch 1457 is closed

1458C—control relay 1458 normally closed contacts

1459—bracket rotary cart tipper jog circuit controls

1460—control relay in series with proximity switch normally open contacts, for example, the contacts are normally open when the cart tipper is in the collision zone

1461—inductive proximity switch normally open contacts

1460A—control relay normally open contacts

1469—packer blade jog control circuit

1470—bracket showing packer blade controls

1501—dashed line indicating valve unit including a differential area relief valve 1510, a steering priority flow control valve 1503 with static load sense, and a solenoid operated, 2-way normally open, pilot operated poppet valve 1409 with free reverse flow energized and de-energized

1502—hydraulic pressure input to valve unit 1501

1503—a steering priority flow control valve with static load sense

1504—hydraulic supply line to the packer blade hydraulic system

1505—feedback line

1505R—restriction in line 1505 to the steering priority flow control valve 1503

1506—line from the steering priority flow control valve 1503 to the solenoid operated 2-way valve 1409

1507—line from the steering priority flow control valve 1503 which feeds the hand-operated control valve 1509 which controls flow to the cart tipper 12, 1512

1507K—line from 1507L to a point upstream if the differential area relief valve 1510

1507L—hydraulic line interconnecting line 1507 and lines 1507K and 1507Q

1507M—restriction in line 1507K

1507N—line from the steering priority flow control valve 1503 to the differential area relief valve 1510

1507R—restriction in line 1507

1507Q—hydraulic line from line 1507L to line 1508 leading to the tank, T

1507L—line communicating from line 1507 using lines 1507M, 1507N to the sensing port (unnumbered) on the priority valve 1503

1507T—restriction in line 1507Q

1508—line to the tank

1509—hand operated valve which controls hydraulic operation of the tipper

1509A—portion of hand valve 1509 enabling the supply of pressure to the cart tipper to rotate the cart tipper in the upward direction

1509B—portion of hand valve 1509 enabling the supply of pressure to the cart tipper to rotate the cart tipper in the downward direction

1509I—intermediate portion of hand operated valve which does permit flow to the tipper cart hydraulic

1509H—handle of hand valve 1509

1510—differential area relief valve

1512—hydraulically operated cart tipper symbol

R—rearward coil/starter/contactor

R Interlocks—normally closed contacts of reverse coil/contactor

F Interlocks—normally closed contacts of forward coil/contactor

F—forward coil/starter/contactor

OL—overload contacts

The invention claimed is:

1. A process for operating a waste truck having a packer blade and a rotary cart tipper, wherein said rotary cart tipper includes a rotary actuator, said rotary actuator includes a shaft and a vane integral with said shaft, said rotary cart tipper is driven by said rotary actuator and a hydraulic system capable of driving said rotary actuator of said rotary cart tipper from a first down position to a second upper most position, said packer blade resides in a chamber of said waste truck, comprising the steps of:

detecting the position of said rotary cart tipper using a proximity sensor;

driving, using a hydraulic system, said rotary cart tipper from said first down position to said second upper most position or vice-versa;

dumping refuse in said chamber using said rotary cart tipper;

moving, if said rotary cart tipper is not in said second upper most position, using said hydraulic system, said packer blade within said chamber of said waste truck, said packer blade has a first stored position in said chamber, a second scooping position in the chamber, and a third position compressing said refuse in said chamber; and, preventing operation of said packer blade using said proximity sensor if said cart tipper is in said second upper most position.

2. A process for operating a waste truck having a packer blade and a rotary cart tipper, wherein said rotary cart tipper includes a rotary actuator, said rotary actuator includes a shaft and a vane integral with said shaft, said rotary cart tipper is driven by said rotary actuator and a hydraulic system capable of driving said rotary actuator of said rotary cart tipper from a first down position to a second upper most position, said packer blade resides in a chamber of said waste truck, as claimed in claim 1, wherein said proximity sensor is an inductive proximity sensor.

3. A waste truck having a packer blade in combination with a rotary cart tipper, comprising:

a hydraulic system mounted on said waste truck;

said rotary cart tipper includes a rotary actuator;

said rotary actuator includes a metallic shaft and a housing, said shaft of said rotary actuator includes a cylindrical surface and an arcuate slot therein;

said rotary cart tipper has a first down rotational position for gripping a refuse container and a second up rotational position for dumping said refuse container into a chamber of said waste truck;

said hydraulic system is capable of driving said shaft of said rotary actuator of said rotary cart tipper from said first down rotational position to said second up rotational position or vice-versa;

said packer blade resides in said chamber of said waste truck, said packer blade is capable of movement and does move within said chamber of said waste truck, said packer blade has a first stored position in said chamber, a second scooping position in the chamber, and a third position compressing said refuse in said chamber;

said hydraulic system is capable of driving and moving said packer blade;

an electrical circuit for controlling a solenoid operated, 2-way normally open, pilot operated hydraulic poppet valve, wherein, when said solenoid is deenergized, hydraulic flow and pressure are applied through said valve and to said packer blade for operation thereof, and, when said solenoid is energized, hydraulic flow and pressure are not applied to said packer blade but may be removed from said packer blade;

an inductive proximity sensor mounted in said housing of said rotary actuator in proximity to said shaft of said rotary actuator;

said inductive proximity sensor is capable of detecting a rotary position of said cylindrical surface of said metallic shaft and said arcuate slot therein;

said inductive proximity sensor includes normally open contacts;

a control relay in series with said normally open contacts of said inductive proximity sensor;

wherein, when said inductive proximity sensor is in proximity to said arcuate slot in said metallic shaft, said normally open contacts remain open and said control relay is not energized;

said control relay includes normally closed contacts in series with said solenoid operated, 2-way normally open, pilot operated hydraulic poppet valve, thereby energizing said valve and preventing hydraulic flow and pressure from being applied to said packer blade; and, wherein, when said inductive proximity sensor is in proximity to said cylindrical metallic shaft, said normally open contacts of said inductive proximity sensor close and said control relay is energized, thereby opening said normally closed contacts of said control relay, deenergizing said solenoid operated, 2-way normally open, pilot operated hydraulic poppet valve, and permitting hydraulic flow and pressure to be applied to said packer blade.

4. A waste truck having a packer blade in combination with a rotary cart tipper as claimed in claim 3, wherein said shaft material is selected from the group of materials consisting of steel, stainless steel, brass, aluminum and copper.

5. A waste truck having a packer blade in combination with a rotary cart tipper as claimed in claim 3, wherein said arcuate slot is 3 mm in depth.

6. A waste truck having a packer blade in combination with a rotary cart tipper as claimed in claim 3, wherein said arcuate slot is in the range of 5-90°.

7. A waste truck having a packer blade in combination with a rotary cart tipper as claimed in claim 3, wherein said arcuate slot has an arcuate bottom 3 mm deep beneath the surface of said shaft of said rotary cart tipper and said arcuate slot is 10 mm wide.

8. A process for operating a waste truck having a packer blade, said packer blade resides in a chamber of said waste truck, said rotary cart tipper driven by a rotary actuator, said rotary actuator includes a shaft, said shaft includes an arcuate slot which extends θ degrees, comprising the steps of:

driving, using a hydraulic system, said rotary actuator of said rotary cart tipper from a first down position to a second up position or vice-versa;

controlling a solenoid operated, 2-way normally open, pilot operated hydraulic poppet valve using an electrical circuit;

applying hydraulic flow and pressure through said valve and to said packer blade for operation thereof when said solenoid is deenergized, and not applying hydraulic flow and pressure to said packer blade but removing hydraulic flow and pressure from said packer blade when said solenoid is energized;

dumping refuse in a chamber of said waste truck using said rotary cart tipper;

moving, if said rotary cart tipper is not in said second up position, using said hydraulic system, said packer blade within said chamber of said waste truck.

9. The process of claim 8, wherein said packer blade has a first stored position in said chamber, a second scooping position in the chamber, and a third position compressing said refuse in said chamber and wherein said arcuate slot is in the range of 5-90°.

10. A waste truck having a packer blade in combination with a rotary cart tipper, comprising:

a hydraulic system mounted on said waste truck;

said rotary cart tipper includes a rotary actuator;

said rotary actuator includes a shaft and a housing, said shaft of said rotary actuator includes an arcuate slot therein;

said hydraulic system is capable of driving said shaft of said rotary actuator of said rotary cart tipper from a first down rotational position into a collision zone and to a second up rotational position within said collision zone;

said hydraulic system is capable of driving said shaft of said rotary actuator of said rotary cart tipper from said second up rotational position within said collision zone through said collision zone and to said first down rotational position;

said packer blade resides in said chamber of said waste truck, said packer blade is capable of moving within said chamber of said waste truck, said packer blade has a first stored position in said chamber, a second scooping position in the chamber, and a third position compressing said refuse in said chamber;

said hydraulic system is configured to drive and move said packer blade from: said first stored position to a second scooping position, and, then to said third position whereby said refuse is compressed in said chamber;

said hydraulic system is configured to drive and move said packer blade from said third position back to said second position and thence back to said stored position;

an inductive proximity sensor mounted in said housing of said rotary actuator in proximity to said shaft of said rotary actuator;

an electrical circuit for controlling a solenoid operated, 2-way normally open, pilot operated hydraulic poppet valve, wherein, when said solenoid is deenergized hydraulic flow and pressure are applied through said valve and to said packer blade for operation thereof, and, when said solenoid is energized, hydraulic flow and pressure are not applied to said packer blade but may be removed from said packer blade;

said inductive proximity sensor is configured to detects the rotary position of said cylindrical surface of said metallic shaft and said arcuate slot therein;

said inductive proximity sensor includes normally open contacts;

a control relay in series with said normally open contacts of said inductive proximity sensor;

wherein, when said inductive proximity sensor is in proximity to said arcuate slot in said metallic shaft, said normally open contacts remain open and said control relay is not energized and, said control relay includes normally closed contacts in series with said solenoid operated, 2-way normally open, pilot operated hydraulic poppet valve, thereby energizing said valve and preventing hydraulic flow and pressure from being applied to said packer blade; and, wherein, when said inductive proximity sensor is in proximity to said cylindrical metallic shaft, said normally open contacts of said inductive proximity sensor close and said control relay is energized, thereby opening said normally closed contacts of said control relay, deenergizing said solenoid operated, 2-way normally open, pilot operated hydraulic poppet valve, and permitting hydraulic flow and pressure to be applied to said packer blade.

11. A rotary cart tipper, comprising:

a rotary actuator;

said rotary actuator includes a metallic shaft, a vane integral with said metallic shaft, and a housing; said metallic shaft includes an arcuate slot therein;

said rotary cart tipper has a first down rotational position for gripping a refuse container and a second up rotational position for dumping said refuse container into a chamber of said waste truck;

a device capable of driving said integral vane of said metallic shaft of said rotary actuator from said first down rotational position to said second up rotational position or vice versa;

a proximity sensor mounted in said housing of said rotary actuator in proximity to said shaft of said rotary actuator; and, said proximity sensor is capable of detecting and sensing the presence of said metallic shaft based on the rotary position of said arcuate slot in said shaft.

12. The rotary cart tipper as claimed in claim 11, wherein said device capable of driving said shaft is a hydraulic pressure source.

13. A rotary cart tipper as claimed in claim 11, wherein: said proximity sensor is an inductive proximity sensor.

14. A waste truck having a packer blade in combination with a rotary cart tipper, comprising:

a hydraulic system mounted on said waste truck, said hydraulic system is capable of powering said packer blade and said rotary cart tipper;

a solenoid operated, 2-way normally open, pilot operated poppet hydraulic valve is interconnected with said hydraulic system and is interconnected with an inductive proximity sensor;

said rotary cart tipper includes a rotary actuator;

said rotary actuator includes a metallic shaft, a vane integral with said shaft, and a housing, said metallic shaft of said rotary actuator includes a cylindrical surface and an arcuate slot therein;

said hydraulic system is capable of driving said vane of said shaft and said shaft of said rotary actuator of said rotary cart tipper such that said rotary cart tipper moves from a first down position to a second up position within a collision zone;

said hydraulic system is capable of driving said vane of said shaft and said shaft of said rotary actuator of said rotary cart tipper such that said rotary cart tipper moves from said second up position within said collision zone and through said collision zone and to said first down position;

said inductive proximity sensor is mounted in said housing of said rotary actuator in proximity to said shaft of said rotary actuator;

said inductive proximity sensor is configured to senses the position of said metallic shaft based on the rotary position of said arcuate slot in said metallic shaft;

said inductive proximity sensor includes normally open electrical contacts such that said electrical contacts are open when said inductive proximity sensor is in proximity to said arcuate slot of said metallic shaft of said rotary cart tipper;

said normally open electrical contacts of said inductive proximity sensor are configured to close when said inductive proximity sensor is in proximity to said surface of said metallic shaft of said rotary cart tipper;

wherein, when said electrical contacts of said inductive proximity sensor are closed, a control relay electrically communicating with an electrical energy source is energized;

said control relay includes normally closed contacts, wherein, when said control relay is not energized, said normally closed relay contacts of said control relay are configured to be opened when said control relay is energized;

wherein, when said inductive proximity sensor is in proximity with said surface of said metallic shaft of said cart tipper, said electrical contacts of said sensor are configured to be closed and said solenoid operated, 2-way normally open, pilot operated poppet valve is configured to be deenergized and supply hydraulic fluid to said packer blade;

wherein, when said inductive proximity sensor is in proximity with said arcuate slot of said cart tipper, said electrical contacts of said sensor are open and said solenoid operated, 2-way normally open, pilot operated poppet valve is configured to be energized and hydraulic fluid flow and pressure to said packer blade is configured to be blocked.

15. A packer blade control system, comprising:

a solenoid operated 2-way normally open, pilot operated hydraulic poppet valve;

a shaft driving a cart tipper, said shaft includes a cylindrical surface and an arcuate slot in said cylindrical surface;

a housing for mounting said shaft driving said cart tipper;

a rotary position detector mounted in said housing capable of detecting the rotary position of said shaft, said position detector capable of differentiating between said cylindrical surface and said arcuate slot;

said rotary position detector is capable of and configured to deenergizes said solenoid operated 2-way normally open, pilot operated hydraulic poppet valve allowing hydraulic operation of said packer blade when said cart tipper is in a first range of rotational positions not in proximity to said arcuate slot; and, said rotary position detector is capable of and configured to energizes said solenoid operated 2-way normally open, pilot operated hydraulic poppet valve preventing hydraulic operation of said packer blade when said cart tipper is in a second range of rotational positions in proximity to said arcuate slot.

16. A packer blade control system as claimed in claim 15, further comprising:

said shaft and said housing of said cart tipper are formed as a hydraulic rotary actuator;

a priority steering valve providing priority hydraulic flow to a hand-operated tipper control valve and providing extra flow to said solenoid operated 2-way normally open, pilot operated hydraulic poppet valve allowing hydraulic operation of said packer blade when said cart tipper is in said first range of rotational positions not in proximity to said arcuate slot; and, said rotary position detector is configured to energizes-said solenoid operated 2-way normally open, pilot operated hydraulic poppet valve thereby preventing said extra flow hydraulic operation of said packer blade when said cart tipper is in said second range of rotational positions in proximity to said arcuate slot.

17. A packer blade control system as claimed in claim 16, further comprising:

a differential area relief valve for controlling priority hydraulic flow to said hand-operated tipper control valve.

18. A packer blade control system as claimed in claim 15, wherein:

said rotary position detector is an inductive proximity sensor.

19. A waste truck having a packer blade in combination with a cart tipper, comprising:

a hydraulic system mounted on said waste truck;

said cart tipper has a first down position for gripping a refuse container and a second upper most position for dumping said refuse container into a chamber of said waste truck;

said hydraulic system is configured to drive said cart tipper from said first down position to said second upper most position;

said waste truck includes said chamber and said waste truck is configured to receive refuse from said refuse container in said chamber;

said packer blade resides in said chamber of said waste truck, said packer blade is movable within said chamber of said waste truck, said packer blade has a first stored position in said chamber, a second scooping position in the chamber, and a third position compressing said refuse in said chamber;

said hydraulic system is configured to drive and move said packer blade;

said cart tipper includes a proximity sensor;

said proximity sensor is capable of detecting said first down position or said second upper most position of said cart tipper;

said proximity sensor is configured to prevent operation of said packer blade when said cart tipper is in said second upper most position;

said cart tipper is affixed to said waste truck by a mounting plate;

said proximity sensor is configured to prevent operation of said packer blade by the application of voltage to a solenoid operated 2 position packer blade hydraulic interrupt valve configured for removing hydraulic system fluid pressure from said packer blade; and, said application of voltage to said solenoid operated 2 position packer blade hydraulic interrupt valve occurs when said proximity sensor outputs a voltage configured to indicate that said cart tipper is within a collision zone, said collision zone defined as a vertical plane extending from said mounting plate of said cart tipper.

20. A waste truck having a packer blade in combination with a cart tipper, comprising:

a hydraulic system mounted on said waste truck;

said cart tipper has a first down position for gripping a refuse container and a second upper most position for dumping said refuse container into a chamber of said waste truck;

said hydraulic system is configured to drive said cart tipper from said first down position to said second upper most position;

said waste truck includes said chamber and said waste truck is configured to receive refuse from said refuse container in said chamber;

said packer blade resides in said chamber of said waste truck, said packer blade is movable within said chamber of said waste truck, said packer blade has a first stored position in said chamber, a second scooping position in the chamber, and a third position compressing said refuse in said chamber;

said hydraulic system is configured to drive and move said packer blade;

said cart tipper includes a proximity sensor;

said proximity sensor is capable of detecting said first down position or said second upper most position of said cart tipper;

said proximity sensor is configured to prevent operation of said packer blade when said cart tipper is in said second upper most position;

said cart tipper includes a rotary actuator, said rotary actuator includes a shaft and a vane integral with said shaft, and said cart tipper is driven by said rotary actuator; and, said hydraulic system is capable of driving said rotary actuator of said cart tipper from said first down position to said second upper most position.

* * * * *